(12) United States Patent
Wilson et al.

(10) Patent No.: US 11,881,694 B2
(45) Date of Patent: Jan. 23, 2024

(54) DATA CABLE SUPPORT

(71) Applicant: ERICO International Corporation, Solon, OH (US)

(72) Inventors: Eric J. Wilson, Solon, OH (US); Daniel A. Kozlowski, Sagamore Hills, OH (US); Jeff A. Wilson, Cuyahoga Falls, OH (US); Raymond M. Olle, Valley View, OH (US); Paul Bryson Allen, Naperville, IL (US)

(73) Assignee: ERICO International Corporation, Solon, OH (US)

(*) Notice: Subject to any disclaimer, the term of this patent is extended or adjusted under 35 U.S.C. 154(b) by 0 days.

(21) Appl. No.: 17/723,860

(22) Filed: Apr. 19, 2022

(65) Prior Publication Data
US 2022/0337041 A1 Oct. 20, 2022

Related U.S. Application Data

(60) Provisional application No. 63/270,182, filed on Oct. 21, 2021, provisional application No. 63/176,784, filed on Apr. 19, 2021.

(51) Int. Cl.
*F16L 3/00* (2006.01)
*H02G 3/04* (2006.01)
*F16L 3/10* (2006.01)

(52) U.S. Cl.
CPC .......... *H02G 3/0456* (2013.01); *F16L 3/1075* (2013.01)

(58) Field of Classification Search
None
See application file for complete search history.

(56) References Cited

U.S. PATENT DOCUMENTS

| 799,092 | A | * | 9/1905 | Rosenfeld | F16L 3/2235 248/68.1 |
|---|---|---|---|---|---|
| 944,731 | A | * | 12/1909 | Gold | F16L 3/2235 248/68.1 |
| 3,130,948 | A | | 4/1964 | Bedford, Jr. | |
| 4,039,131 | A | | 8/1977 | Perrault et al. | |
| 4,181,279 | A | | 1/1980 | Perrault et al. | |
| 4,709,888 | A | | 12/1987 | Cubit et al. | |
| 5,110,074 | A | | 5/1992 | Deguchi | |
| 5,740,994 | A | | 4/1998 | Laughlin | |
| 5,961,081 | A | | 10/1999 | Rinderer | |
| 5,988,570 | A | | 11/1999 | Gretz | |

(Continued)

FOREIGN PATENT DOCUMENTS

| CN | 201250954 Y | 6/2009 |
|---|---|---|
| CN | 11697518 B | 8/2021 |

(Continued)

*Primary Examiner* — Steven M Marsh
(74) *Attorney, Agent, or Firm* — Quarles & Brady LLP

(57) ABSTRACT

A cable support includes a support body, a mounting tab, and at least one extension connecting the mounting tab to the support body. The support body includes a saddle configured to support cables and a stem extending in a first direction from a rear end of the saddle, which is opposite a front end. The mounting tab is configured to be secured to a support structure and includes a secondary tab. The at least one extension is bendable to move the mounting tab between a wall-mount configuration and a rod-mount configuration.

20 Claims, 14 Drawing Sheets

(56) References Cited

U.S. PATENT DOCUMENTS

| | | | |
|---|---|---|---|
| 6,222,128 B1* | 4/2001 | Gretz | H02G 3/26 248/62 |
| 6,332,594 B2 | 12/2001 | Shelton et al. | |
| 6,565,048 B1 | 5/2003 | Meyer | |
| 6,629,676 B1 | 10/2003 | Gretz | |
| 6,719,247 B1* | 4/2004 | Botting | F16L 3/02 248/339 |
| 7,021,591 B1* | 4/2006 | Gretz | F16L 3/223 248/68.1 |
| 7,407,138 B1 | 8/2008 | Gretz | |
| 7,520,476 B2 | 4/2009 | Caveney et al. | |
| 7,789,359 B2 | 9/2010 | Chopp, Jr. et al. | |
| 7,837,156 B1 | 11/2010 | Handler | |
| 8,616,512 B2 | 12/2013 | McMath et al. | |
| 8,840,071 B2 | 9/2014 | Oh et al. | |
| 9,835,272 B1 | 12/2017 | Handler | |
| D817,747 S | 5/2018 | Dockery et al. | |
| 10,253,905 B2 | 4/2019 | Martin | |
| 10,920,910 B1 | 2/2021 | Gretz | |
| 11,105,443 B2 | 8/2021 | Wu et al. | |
| 2003/0047649 A1 | 3/2003 | Miescher et al. | |
| 2003/0102412 A1 | 6/2003 | Miescher | |
| 2004/0113024 A1* | 6/2004 | Caveney | H02G 3/0456 248/68.1 |
| 2008/0093510 A1 | 4/2008 | Oh et al. | |
| 2009/0236477 A1 | 9/2009 | Oh | |
| 2010/0102175 A1 | 4/2010 | Dockery et al. | |
| 2010/0224738 A1 | 9/2010 | Bourgeois | |
| 2011/0242280 A1 | 10/2011 | Mishima et al. | |
| 2015/0069190 A1* | 3/2015 | Bartos | F16L 3/04 248/74.1 |
| 2020/0408333 A1 | 12/2020 | Kellerman | |
| 2022/0216678 A1 | 7/2022 | Anderson et al. | |

FOREIGN PATENT DOCUMENTS

| | | |
|---|---|---|
| EP | 2218954 B1 | 10/2014 |
| WO | 2018/121996 A1 | 7/2018 |

* cited by examiner

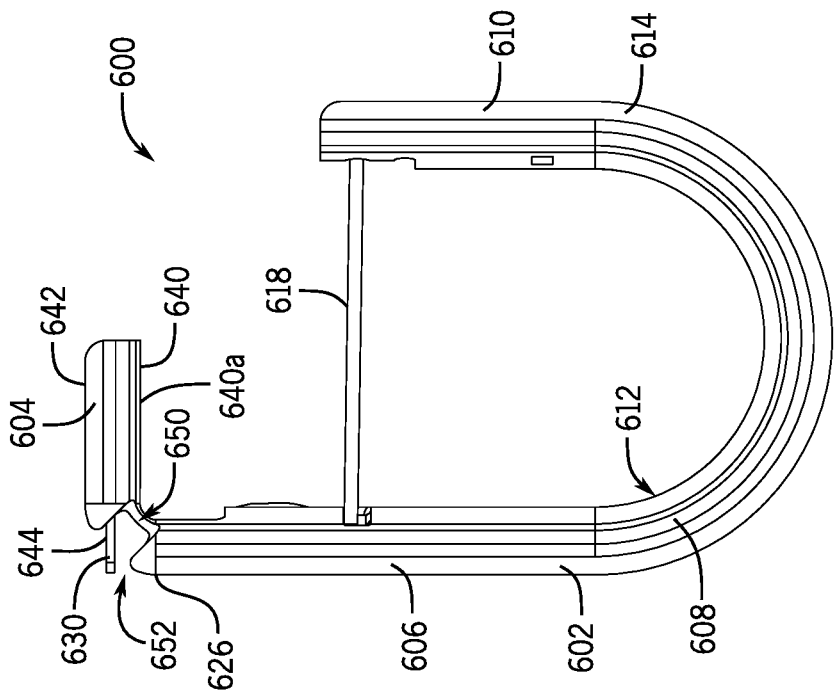
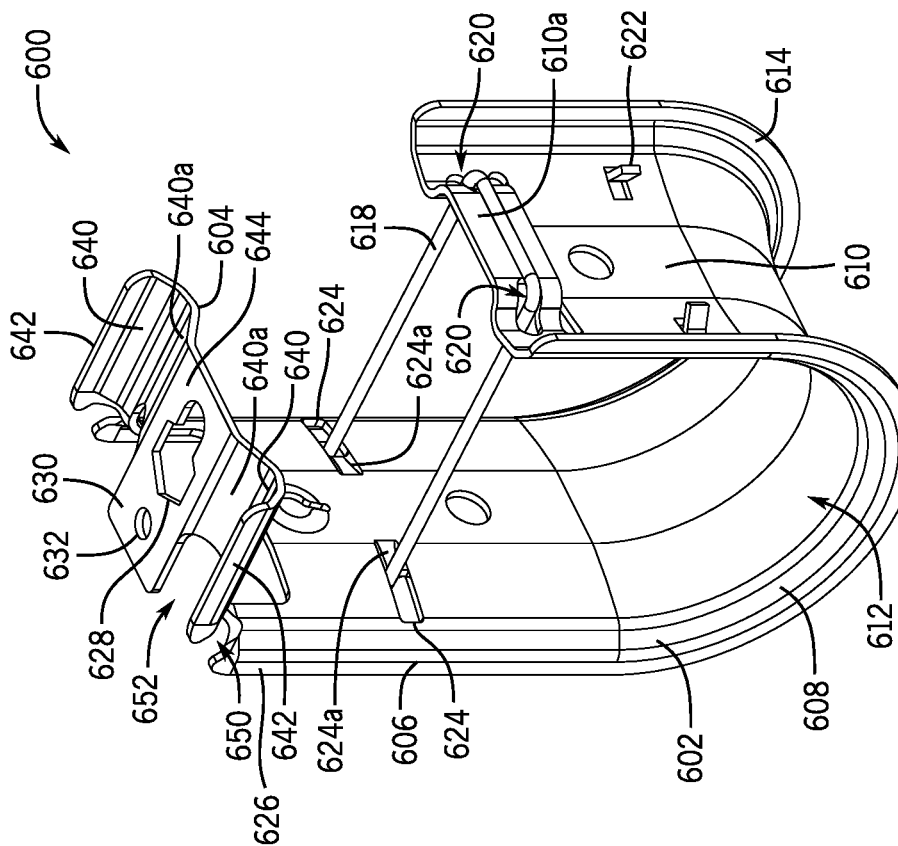

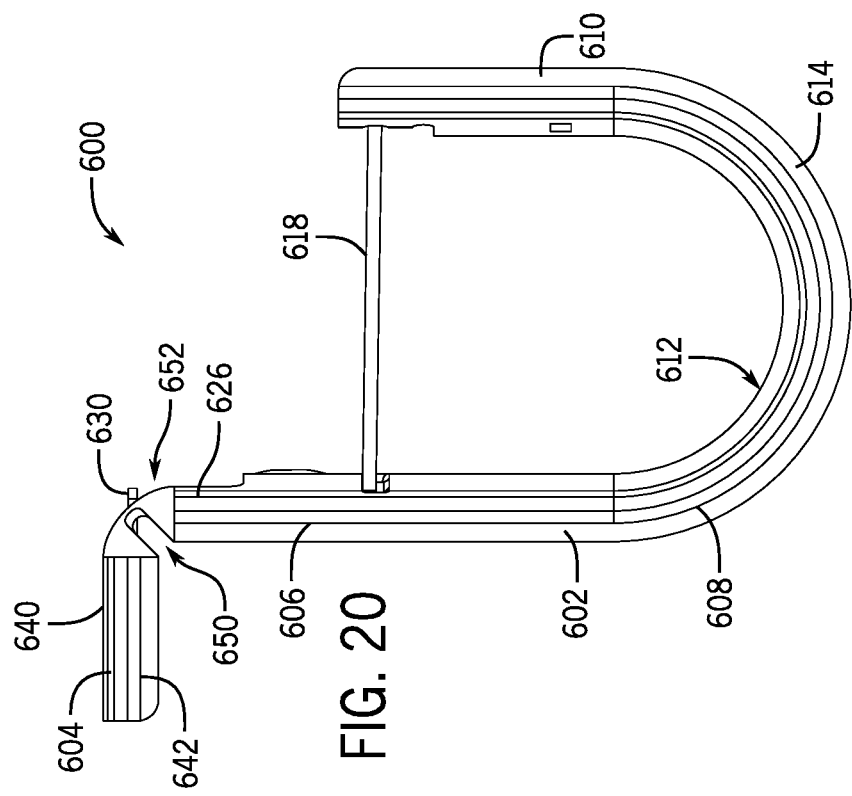
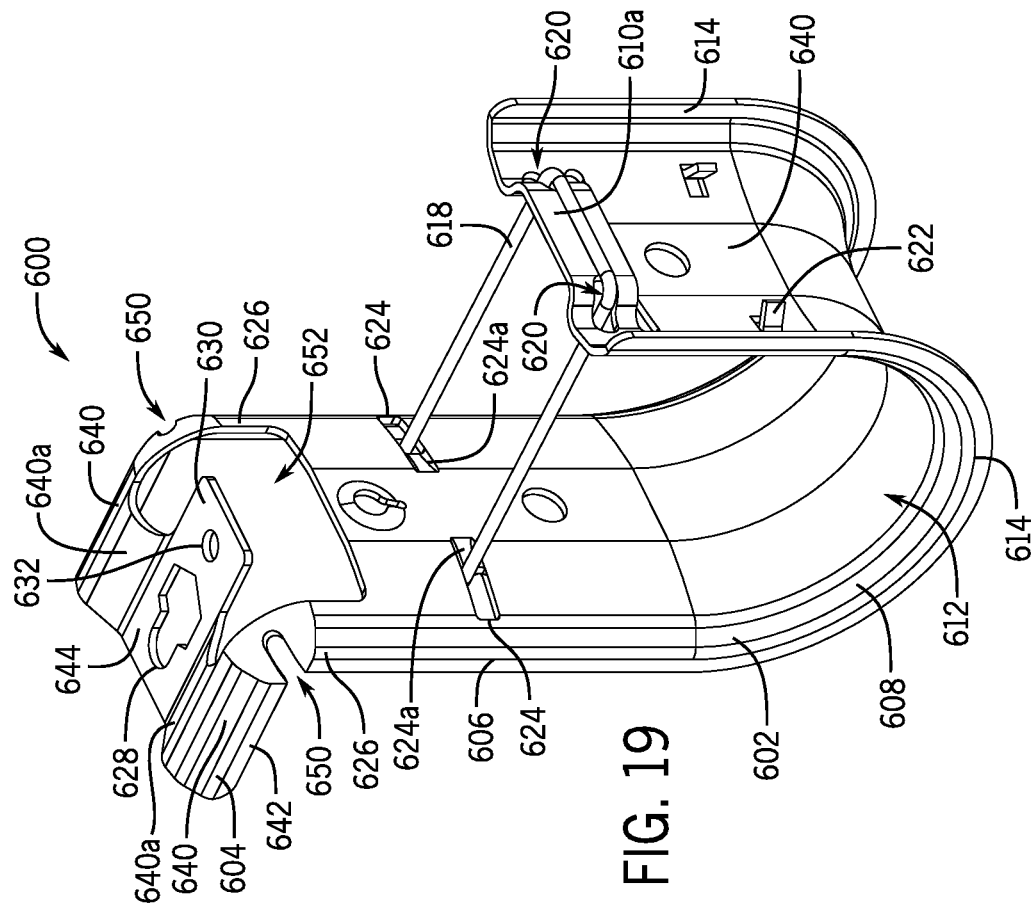

DATA CABLE SUPPORT

CROSS-REFERENCE TO RELATED APPLICATIONS

This application claims priority to provisional patent application No. 63/176,784, filed Apr. 19, 2021, and to provisional patent application No. 63/270,182, filed Oct. 21, 2021, both of which are incorporated herein by reference.

BACKGROUND

Non-continuous supports are used as a simple and cost effective way to hang data cables and other equipment/objects. In particular, some non-continuous supports can be configured as hooks, to hang data cables from a variety of structures and in a variety of orientations.

SUMMARY

Embodiments of the invention can provide improved non-continuous supports, including for support of data cables.

In some embodiments, a cable support can include a support body, a mounting tab, and at least one extension. The support body can include a saddle configured to support one or more cables and a stem that extends in a first direction from a rear end of the saddle that is opposite a front end of the saddle. The mounting tab can be configured to be secured to a support structure. The mounting tab can extend from the stem and can include a secondary tab. The at least one extension can connect the mounting tab to the support body so that there is an opening between the secondary tab and the support body. The extension tab may also be bendable relative to the support body to the move the mounting tab between a wall-mount configuration, a ceiling-mount configuration, and a rod-mount configuration. In the wall-mount configuration, the mounting tab extends substantially parallel to the first direction and away from the stem, and the secondary tab extends substantially parallel to the first direction and toward the stem. In the ceiling-mount configuration, the mounting tab extends in a forward direction relative to the saddle and the secondary tab extends in a rearward direction relative to the saddle. In the rod-mount configuration, the mounting tab extends in a rearward direction relative to the saddle and the secondary tab extends in a forward direction relative to the saddle.

In some embodiments, the at least one extension can include a first extension and a second extension that are separated by the opening. Further, in some cases, the mounting tab can include a central flattened portion between lateral contoured portions. The first extension and the second extension can extend between respective lateral contoured portions and the stem. The central flattened portion can include one or more holes configured to receive a fastener to secure the cable support to a support structure (e.g., a building structure). The secondary tab can extend from the central flattened portion and can include at least one of the one or more holes.

In some embodiments, except for one or more bend features, the first and second extensions and the lateral contoured portions of the mounting tab extend continuously from lateral contoured portions of the stem. The first and second extensions can each include a bend feature configured as a notch.

In some embodiments, the lateral contoured portions can include sidewalls that extend rearward to define a rear plane of the mounting tab. The central flattened portion can be offset forward of the rear plane so that the sidewalls engage the support structure as the cable support is secured to the support structure at the central flattened portion. The engagement of the sidewalls with the support structure can prevent the cable support from rotating.

In some embodiments, the support body can further include a leg extending from the front end of the stem in a second direction. The second direction can be the same as the first direction.

In some embodiments, a cable support for use with building structures can include a support body and a mounting tab. The support body can include a saddle configured to support one or more cables and a stem that extends from a first end of the saddle in a first direction. The mounting tab can extend from the stem and can include one or more holes configured to receive a fastener to secure the cable support to one or more building structures. The cable support can be bendable to move the mounting tab relative to the support body. The mounting tab can move between a wall-mount configuration, a ceiling-mount configuration, and a rod-mount configuration. In the wall-mount configuration, the mounting tab extends substantially in parallel with the first direction. In the ceiling-mount configuration, the mounting tab is rotated away from the wall-mount configuration in a first rotational direction to extend over the saddle. In the rod-mount configuration, the mounting tab is rotated away from the wall-mount configuration in a second rotational direction to extend away from the saddle.

In some embodiments, a secondary tab can extend from the mounting tab and move with the mounting tab relative to the support body. The secondary tab can extend substantially in parallel with the first direction in the wall-mount configuration, away from the saddle in the ceiling-mount configuration, and toward the saddle in the rod-mount configuration. The secondary tab can include at least one of the one or more holes. Additionally, in some cases, the mounting tab can be secured to the support body via extensions that are separated by an opening extending between the mounting tab and the stem. The secondary tab can extend into the opening when the mounting tab is in the wall-mount configuration and pass through the opening when moving between the ceiling-mount and rod-mount configurations.

In some embodiments, the cable support can further include a securing member and one or more retaining tabs. The securing member can be configured to be movable relative to the support body to a first configuration to secure one or more cables within the saddle. The one or more retaining tabs can be configured to secure the securing member in a second configuration to permit one or more cables to be moved into or out of the saddle. In some cases, the securing member can be a bail that can be pivotally and slidably secured at a distal end of a leg of the support body, which can extend from a second end of the saddle opposite the stem. Additionally, the one or more retaining tabs can be formed as hooks on one or more of: the leg, between the distal end of the leg and the saddle; and the saddle.

In some embodiments, at least one bend feature can be provided between the stem and the mounting tab to allow the mounting tab to bend relative to the stem. In some cases, the at least one bend feature can include at least two notches that can be disposed along opposing lateral sides of the cable support.

In some embodiments, a method of installing a cable support to a support structure can include securing a support body to the support structure via a mounting tab. The support body can include a saddle configured to support one or more cables and the stem can extend from a first end of the saddle in a first direction. The mounting tab can extend from the stem in a second direction, and can include one or more holes configured to receive a fastener to secure the support body to the support structure and a secondary tab. The method can further include applying a force to the support body to selectively bend the mounting tab relative to the support body to any one of a wall-mount configuration, a ceiling-mount configuration, and a rod-mount configuration. In the wall-mount configuration, the mounting tab extends substantially parallel to the first direction and away from the stem and the secondary tab extends substantially parallel to the first direction and toward the stem. In the ceiling-mount configuration, the mounting tab is rotated away from the wall-mount configuration in a first rotational direction to extend over the saddle, and the secondary tab extends away from the saddle. In the rod-mount configuration, the mounting tab is rotated away from the wall-mount configuration in a second rotational direction to extend away from the saddle, and the secondary tab extends toward the saddle. In some cases, the force can be applied to the support body after the support body is secured to the support structure via the mounting tab, or the force can be applied to the support body prior to securing the support body the support structure via the mounting tab.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 17 is an isometric view of the data cable support of FIG. 15 in a first bent configuration;

FIG. 18 is a side view of the data cable support of FIG. 15 in the first bent configuration;

FIG. 19 is an isometric view of the data cable support of FIG. 15 in a second bent configuration; and FIG. 20 is a side view of the data cable support of FIG. 15 in the second bent configuration.

DETAILED DESCRIPTION

Figure 1:
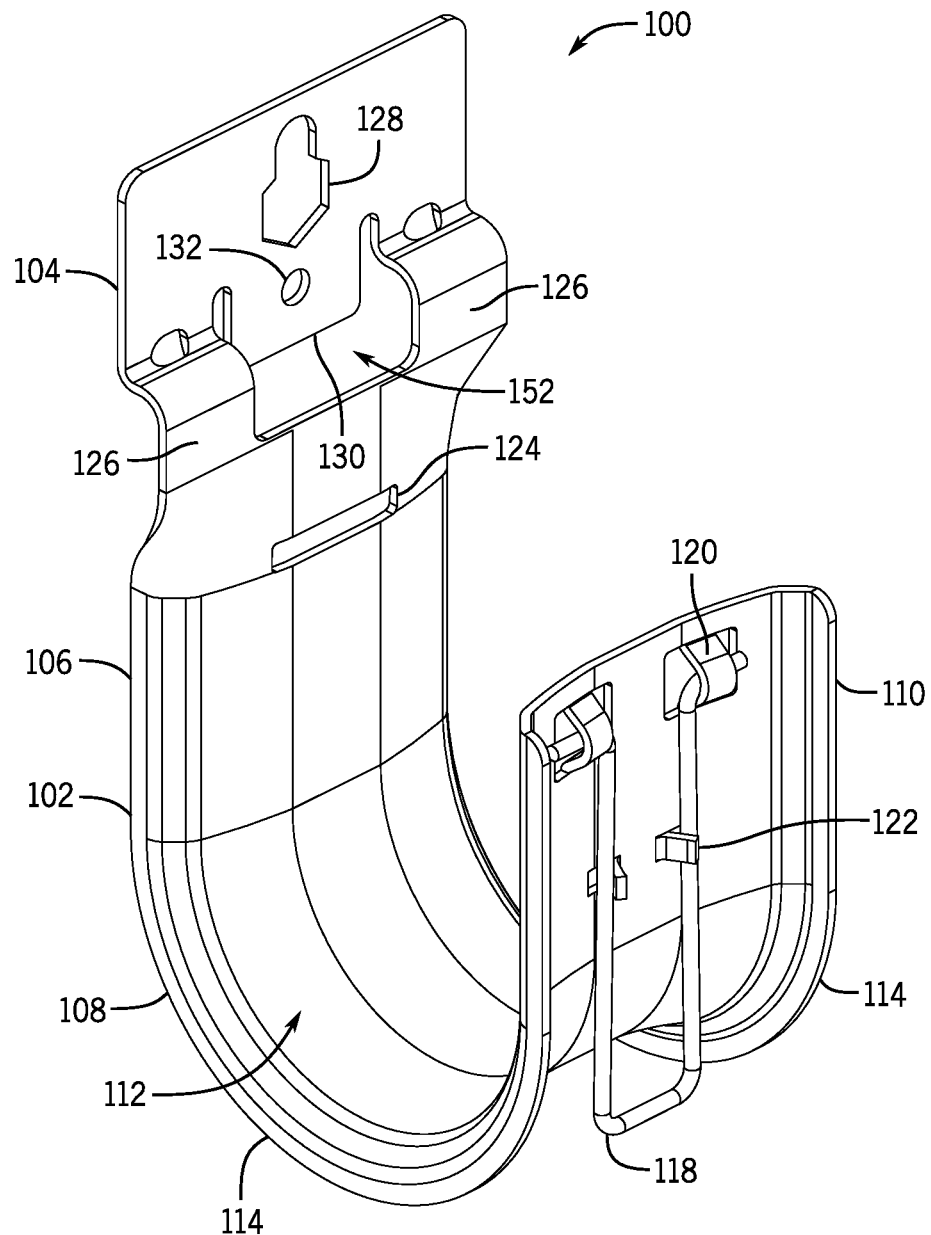
FIG. 1 is an isometric view of a data cable support according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, unless otherwise limited or defined, "integral" and derivatives thereof (e.g., "integrally") describe elements that are manufactured as a single piece without fasteners, adhesive, or the like to secure separate components together. For example, an element stamped, cast, or otherwise molded as a single-piece component from a single piece of sheet metal or using a single mold, without rivets, screws, or adhesive to hold separately formed pieces together is an integral (and integrally formed) element. In contrast, an element formed from multiple pieces that are separately formed initially then later connected together, is not an integral (or integrally formed) element.

As noted above, non-continuous supports can be used to hang data cables from a variety of structures, and in a variety of orientations. For example, non-continuous supports may be mounted to a wall or hung from a ceiling or a rod. Depending on the application, some supports may use various types of fasteners to secure the supports to the desired structure.

Conventional non-continuous supports are generally designed to be mounted on specific types of structures, for example only a wall or only a ceiling. Thus, many conventional supports may include corresponding mounting features designed only for one specific mounting scenario (e.g., wall-mount or ceiling-mount configurations). Relatedly, conventional supports can be relatively complex, bulky, and expensive to produce. Additionally, some conventional mounting features can interfere with tools used to install the support on a structure, or can otherwise result in difficult installation where space is at a premium, including in overhead-mounted arrangements (i.e., configurations in which a support is suspended from an overhead support structure, e.g., a horizontal ceiling, including through direct connection to the overhead support structure or via securement to a threaded rod or other structure that is supported by and extends downward from the overhead support structure). Additionally, because of the specialized nature of many of these conventional supports, an installer may be required to purchase and use many different types of supports to complete an installation.

Embodiments of the disclosed invention can provide improvements over conventional supports for data cables, including by providing more compact size, and the capability to be used in multiple different mounting scenarios. For example, some embodiments include a bendable mounting tab and associated support and relief structures that allow the mounting tab to be bent into a desired orientation by an installer. Thus, for example, a single cable support can be customizably mounted to vertical, horizontal, and other support surfaces (e.g., building structures).

In some embodiments, a mounting tab can include a variety of holes or other attachment features, which are configured to allow a support to be mounted to a structure in a number of different ways, and can be selectively bendable to various mounting configurations (e.g., in one or more ceiling-, rod- or other overhead-mount configurations and in one or more horizontal or vertical wall-mount configurations). Thus, for example, a mounting tab that can be bent into different orientations, to be mounted in a number of different ways, can allow an installer to use a single, compact bracket on a wide variety of structures and in multiple orientations. For example, a mounting tab can be hung from a vertical structure, such as a wall, in an unbent configuration. Alternatively, the same mounting tab can be bent along a first rotational direction (e.g., forward toward a saddle of the support) to allow the support to be mounted to (e.g., hung from) a ceiling, or along a second rotational direction (e.g., rearward away from a saddle of the support) to allow the support to be hung from a threaded rod (or otherwise) or mounted over the edge of a wall.

Relatedly, the mounting tab can be bent to a desired orientation before or after the support is secured to a building structure via a mounting tab. That is, the mounting tab can be bent relative to the support body (e.g., by applying a force to the mounting tab or the support body) prior to securing the support to a building structure via the mounting tab. Alternatively, the support can first be secured to a building structure and then a force can be applied to the support body to bend the mounting tab relative to the support body.

In some embodiments, a support can be configured as a J-hook that includes a support body having a leg, a saddle, and a stem. The support can be made of and formed from a single sheet of metal or other material that allows the mounting tab to be bent into a final position. A sidewall may run along the length of the leg, saddle, and stem to provide the support with additional strength and rigidity. The leg, saddle, and stem define a convex surface which receives and supports one or more data cables. However, principles discussed herein can be readily applied to other supports, including non-hook supports, supports formed from multiple pieces, or supports with other structures to engage cables or other supported objects.

In some embodiments, a support may include a u-shaped securing member (e.g., a bail). The securing member can be a metal (e.g., spring steel) wire or other resilient material that resiliently returns to a default shape after being bent or compressed. The support may include attachment portions to receive the securing member and allow it to move between open and closed positions. The support may also include slots or retaining hooks to engage the securing member and retain it in an open or a closed position. Further, in some cases, a securing member can be used as a structural member to increase the capacity of a support.

In some embodiments, a mounting tab is integrally linked to a stem of a support body at a bending region, which can allow the mounting tab to be readily rotated relative to a support body. In embodiments in which the stem is convex and the mounting tab is flat, the stem may thus include a transition region, in which, for example, a pair of sidewalls of the stem curve forward to reduce the curvature of the stem towards flat.

In some embodiments, a mounting tab may include a secondary tab that extends from the mounting tab. For example, in some cases, the mounting tab may extend in a first direction and the secondary tab may extend in a second direction that is opposite the first direction. Accordingly, the secondary tab extends rearward when the mounting tab is rotated in a forward direction (e.g., to extend over a saddle), and forward when the mounting tab is rotated in a rearward direction (e.g., to extend away from the saddle so that the mounting tab does not extend over the saddle). The secondary tab may include a hole that allows for a more optimal location to mount the support to a structure. In particular, the hole can be located closer to the stem, thereby reducing the bending moment on the mounting tab that results from the weight of the data cables when the mounting tab is bent to accommodate attachment to a horizontal surface (e.g., a ceiling member).

In some embodiments, a mounting tab can be attached to a stem by a pair of extensions separated by an opening. The extensions can extend from the top of the stem, near the upper part of a transition region, to connect with the mounting tab. The opening can be sized, for example, to allow a secondary tab to pass through the opening as the mounting tab is rotated.

In some embodiments, a mounting tab may be joined to the stem along its entire width. For example, no secondary tab may be present and there may be no need for extensions separated by a gap. Furthermore, the mounting tab may include u-shaped retaining portions for the securing member to engage within a closed position.

In some embodiments, the mounting tab may also include one or more anti-rotation features. For example, the mounting tab can include one or more prongs that can be bent forward or rearward. The prong can be configured to engage the support surface. For example, the prong can have a pointed distal end that can be pressed into the structure on which the support is mounted. The combination of the prong and the fastener being used to mount the support to the structure prevents the support from rotating.

In some embodiments, a mounting tab can be formed as an extension of a stem. For example, a pair of notches (or one or more other bend features) can be formed along sidewalls of the stem and an open area can be formed between the sidewalls to form lateral extensions and provide a bending region between the stem and the mounting tab, which can allow the mounting tab to be bent relative to the stem by a user. In that regard, the mounting tab may not be a substantially flat member. For example, the mounting tab may have a flattened central portion that extends between and connects opposing lateral contoured portions (e.g., generally u-shaped curved portions). The lateral contoured portions can have cross sections that are similar in shape to the corresponding portions of a stem from which they extend. Put another way the lateral contoured portions (and any intervening extensions) can be continuous extensions of corresponding lateral portions of the stem. Correspondingly, transition regions of varying curvature can connect to the respective lateral contoured portions to the flattened central portion. The flattened central portion can serve as a mounting area and can be provided with one or more holes for receiving a fastener, or other mounting features. The lateral contoured portions can include sidewalls that can engage with a support surface to function as anti-rotation features in some configurations.

FIGS. 1-6 depict one embodiment of a non-continuous support 100 according to aspects of the invention, which is generally configured to hold a plurality of data cables (not shown) or other objects. In the present embodiment the support 100 is a J-hook; however, other shapes and configurations of supports may be used depending on the specific use-case scenario. In this regard, for example, structures discussed relative to securing the support 100 to building structures can be implemented on a variety of other known types of supports for a variety of supported objects. As will be explained in further detail below, the support 100 is configured so that it can be mounted to (e.g., hung from) different structures and in different orientations, for example, hanging from a surface, such as a wall or a ceiling, or a threaded rod.

The support 100 includes a support body 102 and a mounting tab 104, which are integrally formed from a sheet of metal (e.g., mild steel) that can be stamped (or otherwise fabricated) to form the support 100. The support body 102 defines a stem 106, a saddle 108, and a leg 110. The stem 106 is disposed at the back of the support 100, while the leg is disposed at the front of the support 100, with the saddle 108 extending therebetween. In the present embodiment, the stem 106 and the leg 110 are generally straight members that extend upward from the saddle 108, which is a generally u-shaped member, at respective first and second ends of the saddle 108. However, the leg 110, saddle 108, and the stem 106 can have varying curvatures to meet the requirements of a specific application.

As generally noted above, the stem 106 is coupled with the saddle 108 near the rear of the support 100, and the leg 110 is connected with the saddle near the front of the support 100, opposite the stem 106. Thus, the stem 106, saddle 108, and leg 110 together define a hook, and a corresponding support surface 112, that are configured to receive the plurality of data cables. The surface 112 has a smooth, convex curvature that is perpendicular to its length (i.e. the length taken along the stem 106, saddle 108, and leg 110). The curvature of the support surface 112 helps to ensure that the data cables are not excessively bent when being supported by the support 100.

Furthermore, the support body 102 includes sidewalls 114 that are generally locally perpendicular to the length of the support 100 and run substantially along the length of the support body 102 (e.g., along the stem 106, the saddle 108, and the leg 110). In other embodiments, the sidewalls 114 may not be perpendicular or may otherwise vary from one another. The sidewalls 114 are integrally formed with the support body 102 and define an outer surface. The outer surface of the sidewalls 114 and the support surface 112 of the support body 102 adjoin one another so that there is a smooth curvature having an appropriate radius between the two surfaces. Put another way, the surface of the support body 102 transitions smoothly and continuously into the outer surface of the sidewalls 114. Including a continuous curvature between the two surfaces helps to ensure that the data cables are not excessively bent and that there are no sharp edges in contact with the data cables. Furthermore, the sidewalls 114 increase the rigidity and strength of the support 100. In this way, the capacity of the support 100 can be increased. Additionally, as further discussed below, the sidewalls 114 can otherwise improve stability in some installations.

Figure 2:
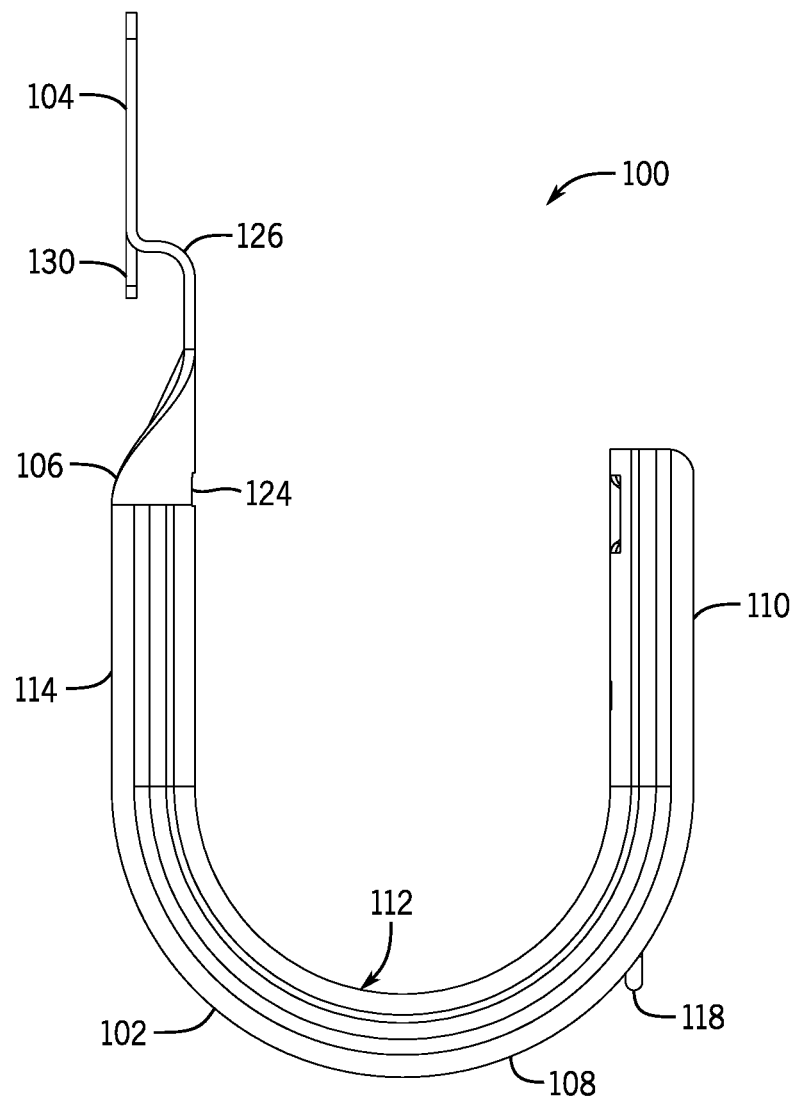
FIG. 2 is a side view of the data cable support of FIG. 1.

With specific reference to FIGS. 1-2, the support 100 is shown as including a securing member 118, although a securing member 118 is not required (see e.g., FIGS. 3-6 showing the support 100 without the securing member 118). Here, the securing member 118 is a bail, formed as a generally u-shaped piece of resilient metal (e.g., bent spring steel wire). However, in other embodiments, the securing member 118 may be made of other resilient materials that resiliently return to a default shape after being bent or compressed. The securing member 118 includes two arms extending perpendicularly from a central portion. Each of the arms includes a hook that extends outwardly from the respective arm, and that is parallel to the central portion.

Figure 3:
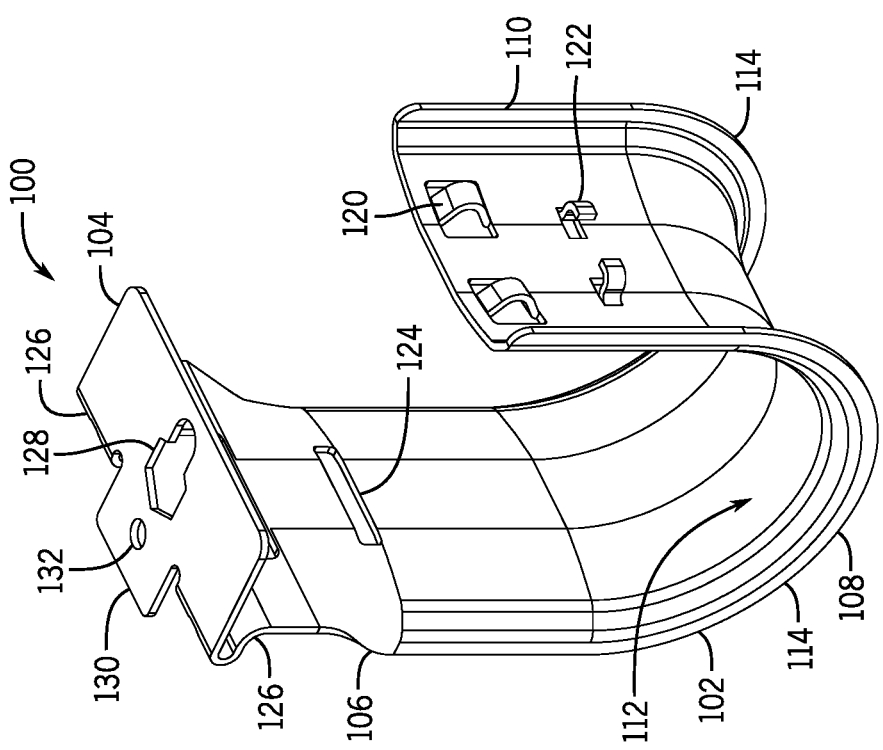
FIG. 3 is an isometric view of the data cable support of FIG. 1 in a first bent configuration.
Figure 5:
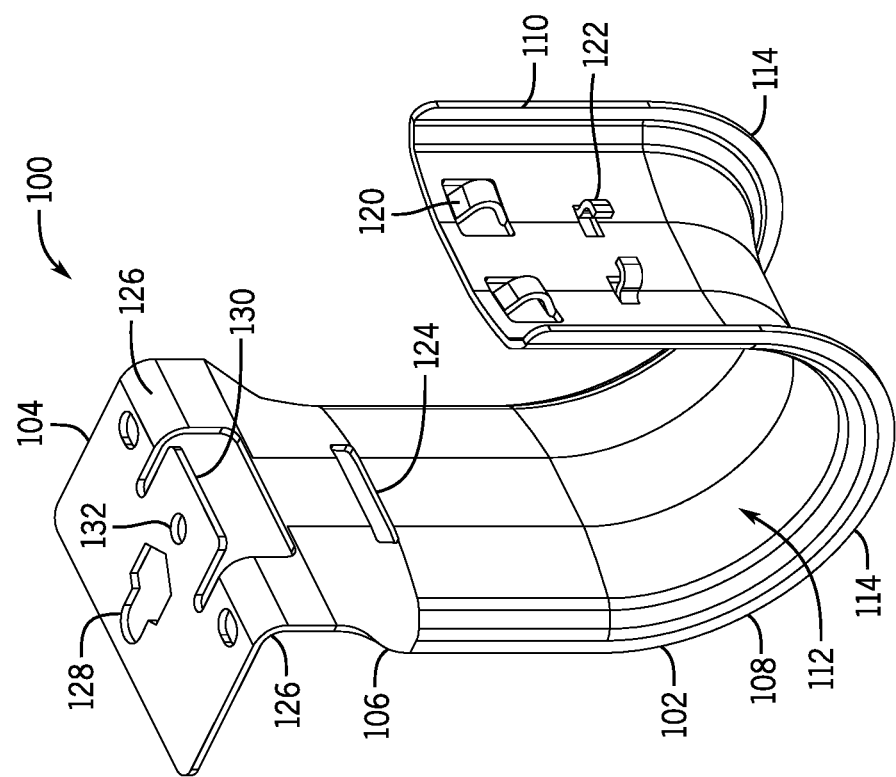
FIG. 5 is an isometric view of the data cable support of FIG. 1 in a second bent configuration.

Generally, supports according to some embodiments can include features that are configured to retain a securing member in different configurations and to allow the securing member to move between one or more open and closed positions. While the support 100 is shown as including certain features in this regard, it should be appreciated that other embodiments may vary. In particular, as shown in FIGS. 1, 3 and 5, the leg 110 of the support 100 includes two attachment features 120 for attaching the securing member 118 to the support 100. The attachment features 120 include two holes extending through the leg 110, with an integrally formed u-shaped loop bridging each of the holes. The attachment features 120 are thus configured to allow the securing member 118 to move between an open position (see FIG. 1), in which data cables can be received by the support 100, and a closed position (not shown), in which the securing member 118 secures the data cable in the support 100. In operation, the arms are slidably received within the holes of the attachment features 120 so that the securing member can be moved between the open and closed positions.

The leg 110 further includes retaining tabs, formed as retaining hooks 122 disposed below the attachment features 120. The retaining hooks 122 are integrally formed with the leg 110 and allow an installer to secure the securing member 118 in an open position (see FIG. 1). For example, to secure the securing member 118 in an open position, an installer can pull the securing member 118 forward (i.e., away from the stem 106, as shown) until the hooks engage with the loops of the attachment features 120. Once the hooks engage with the loops, the securing member 118 can be rotated downward to engage the securing member 118 with the retaining hooks 122 (e.g., with a snap-fit engagement). Once the securing member 118 is engaged with the retaining hooks 122, the retaining hooks 122 will then retain the securing member 118 in the open position. In this regard, it should also be noted that the inclusion of the retaining hooks 122 allows the securing member 118 can be installed at a factory, as the securing member 118 can be reliably held in place by the retaining hooks 122 during shipping.

In some cases, a securing member (e.g., a bail) can be configured to engage features on a stem (or otherwise) to be secured in a closed position. For example, the stem 106 of the support 100 includes a slot 124. In this case, the slot 124 is disposed within a lower portion of the transition region; however, the slot 124 may be positioned higher or lower, or more than one slot may be provided. The slot 124 is configured to receive the hooks of the securing member 118 to retain the securing member in a closed position (not shown). To place the securing member in the closed position, the arms of the securing member 118 are compressed and the securing member 118 is slid rearward (i.e., toward the stem 106, in this case) so that the hooks pass through the slot 124. Once the hooks are received by the slot 124, the arms are released and the hooks engage with the rear of the stem 106, adjacent the ends of the slot 124.

In some embodiments, particular contours or other features can be provided at a slot to help ensure secure engagement with a securing member. For example, in some embodiments, flared edges can be formed at opposite ends of a slot, including at left and right ends of the slot 124 (not shown). Thus, the hooked ends of a securing member can be more securely engaged when inserted into the slot, including in configurations in which the curvature of a structure (e.g., the stem 106) may tend to otherwise diminish the strength of engagement.

Generally, when the securing member 118 is in a closed position, data cables can be reliably retained within the support 100 by the securing member 118. Furthermore, as also discussed below, a securing member can sometimes act as a structural member that can increase the weight capacity of the relevant support.

As stated above, the support 100 includes the mounting tab 104 at an upper distal end of the stem 106 of the support body 102. By including a separate mounting tab 104, deformation of the support body 102 resulting from mounting the support via fasteners, and specifically of the stem 106, can be reduced or eliminated. In the illustrated example, the mounting tab 104 is a generally flat member that is integral with the support body 102 and includes various mounting features to allow the support 100 to be mounted on a variety of surfaces or structures, and in varying orientations. The mounting tab 104 is integral with the support body 102 and a bending portion is defined between the mounting tab 104 and the stem 106, where the support body 102 and the mounting tab 104 intersect. The bending portion is configured to allow the mounting tab 104 to be rotated either forward (e.g., in a first rotational direction) or backward (e.g., in a second rotational direction) about the bending portion, relative to the support body 102 (see FIGS. 3-6). The mounting features and the movement of the mounting tab 104 are discussed in further detail below.

With regard to the connection between the stem 106 and the mounting tab 104, because the mounting tab 104 is a generally flat member and the stem 106 is curved perpendicular to its length, a transition region is defined in the upper end of the stem 106. In the transition region, the stem 106, particularly at the sidewalls 114, flattens to connect with the flat mounting tab 104. In particular, the transition region is defined as the area within the stem 106, within which the sidewalls 114 curve forward, to gradually flatten the stem 106. At the end of the transition region, the now flat distal end of the stem 106 joins with the mounting tab 104 at the bending portion (as also discussed above).

In different embodiments, different structural connections between a support body and a mounting tab (e.g., different transition regions) can be used. As shown in the present embodiment, the distal end of the stem 106 includes two extensions 126 that are separated by an opening 152 (e.g., a gap) formed between the mounting tab 104 and the stem 106. The opening 152 is configured to allow a portion of the mounting tab 104 to extend into the opening 152, and or pass freely through the opening 152 as the mounting tab 104 rotates. In this case, the extensions 126 extend upward and then rearward to the bending portion. In other embodiments, there may be more or fewer extensions, differently configured openings, and so on.

As stated previously, a bending portion is generally defined as a bendable region between (and in some cases on) a stem or other part of a support body and a mounting tab, so that the mounting tab can be easily (e.g. manually) bent between different positions. In the illustrated embodiment, the bending portion includes a curved region of constant radius, with the extensions 126 extending forward from the bending portion and the mounting tab 104 extending upward from the bending portion. Thus arranged, for example, the bending portion acts as a hinge point, allowing the mounting tab 104 to be rotated about the support body 102, relative to the stem 106 and the extensions 126 (see FIGS. 3-6). As shown in FIGS. 3 and 5, for example, the mounting tab 104 can be bent both forward and rearward about the support body 102, thereby allowing the mounting tab 104 to be placed in different orientations for mounting to different structures or in otherwise different configurations. Further, the bending region is shown as including two relief holes in the bending region that make bending the mounting tab 104 easier (e.g., reducing the amount of force that must be applied by an installer to rotate the mounting tab 104). In other embodiments, more or fewer relief holes may be included.

To help secure a support in place, a mounting tab can include any number of features for fastening the support to a variety of structures. For example, in the present embodiment, a keyhole 128 is provided in the mounting tab 104. The keyhole 128 is shown as being disposed near the center of the mounting tab 104; however, the keyhole 128 can also be offset to one side, or it can be moved higher or lower on the mounting tab 104 (e.g., farther from or closer to the bending region). The keyhole 128 includes a large opening connected with a small opening. The large opening is sized so that it can receive the head of a fastener, for example, a bolt or a screw that has been preinstalled. In this case, the large opening has generally a hexagonal perimeter; however, this is not necessary, and the large opening can have a circular, polygonal, or other shape. Similarly, the small opening of the present embodiment has an elongate profile and an end with rounded perimeter, but other shapes are possible. Generally, the size of the keyhole 128 can be varied to accommodate a wide range of fasteners. Furthermore, while the small opening of the keyhole 128 is shown as being positioned above the large opening, the small opening is not limited to this position and can instead be place anywhere around the perimeter of the large opening. Additionally, more than one keyhole (or other similarly arranged opening) may be provided in some embodiments.

As shown in FIGS. 1-6, the mounting tab 104 includes a secondary tab 130 that extends from one side of mounting tab 104. The secondary tab 130 is integral with the mounting tab 104 and moves with the mounting tab 104. In the present embodiment, the secondary tab 130 extends downward from the mounting tab 104 and past the bending region. Further, the secondary tab 130 is sized to fit through the opening 152 between the extensions 126 as the mounting tab 104 is rotated relative to the support body 102. Thus, the mounting tab 104 can be bent to a variety of orientations without the secondary tab 130 interfering with the extensions 126, or the support body 102 generally.

In some cases, a secondary tab can allow for improved alignment and balance of forces upon installation of a support, including as may result in reduced moments on certain components due to loading of the support. For example, in the illustrated embodiment, the secondary tab 130 includes a hole 132 that is configured to receive various types of fasteners, for example, screws or rivets, or shot-fired fasteners. In the present embodiment, the hole 132 is a circular hole that disposed in the center of the secondary tab 130. However, it should be appreciated that the hole 132 can be placed anywhere on the secondary tab 130, and may be a number of shapes, for example, circular, polygonal, or other shapes. Furthermore, while the mounting tab 104 is shown as having one secondary tab 130, other embodiments may have more than one secondary tab 130, or none.

With particular reference to FIGS. 1-2, the support 100 is shown in an unbent configuration. The unbent configuration may be preferable when mounting the support 100 to a vertical surface, e.g., a wall, but may also be used in other mounting scenarios. In the unbent configuration the mounting tab 104 extends substantially upward from the bending region. Put another way, the mounting tab is in a substantially parallel (i.e., equal to or within 10 degrees of parallel) to a first vertical direction and to a main direction of the stem 106, so that the main section of the mounting tab 104 extends upwards from the bending region while the secondary tab 130 extends downward past the bending region. As is best seen in FIG. 2, because the extensions 126 extend rearward, the mounting tab 104 is disposed adjacent to and slightly forward of a rear plane defined by the rearmost edge of the sidewalls 114, although the position of a mounting tab relative to a rear plane can vary in other embodiments. In some cases, such a configuration can assist in effectively distributing forces on a fastener that secures the mounting tab to building structures, between shear and tensile forces. In addition, positioning a mounting tab relatively close to and parallel (e.g., flush) with a rear plane of a support (e.g., a rear face of the mounting tab is co-planar with a rear plane of the support defined by the rearmost edge of each sidewall) can help to reduce deformation of the support 100, including as may otherwise result from the fasteners used to secure the support 100 to a structure. For example, in contrast to conventional designs, installation of a fastener through the mounting tab 104, to secure the support 100 to a building structure via the mounting tab 104, may tend not to deform the stem 106, or the support 100 generally, because the mounting tab 104 is generally offset rearward from a front plane of the stem 106.

It should also be appreciated that, because the sidewalls 114 extend rearward beyond the stem 106, the stem 106 may only contact a surface of a building structure, for example, a wall, at the edges of the sidewalls 114. Thus, not only can the sidewalls 114 increase the strength of the support 100 generally, they can also provide a more stable mounting configuration than conventional designs, including as can accommodate variations and discontinuities in the surface of the structure.

Figure 4:
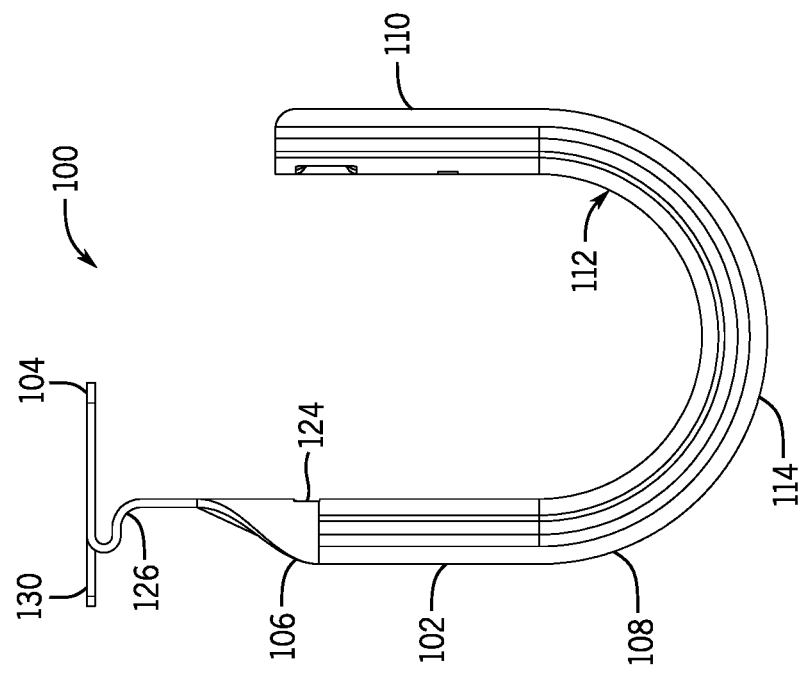
FIG. 4 is a side view of the data cable support of FIG. 1 in a first bent configuration.

As generally noted above, an appropriately configured bending region can allow a user to also install a support for engagement with other building structures. Turning to FIGS. 3-4, for example, the support 100 is shown in a first bent configuration, as may be preferable when mounting (e.g., hanging) the support 100 to a horizontal surface, such as a ceiling. To reach the first bent configuration from the unbent configuration, the mounting tab 104 is rotated (e.g., manually) to be substantially perpendicular to the first vertical direction, so that the mounting tab 104 extends forward towards the leg 110. Correspondingly, the secondary tab 130 will extend rearward, in an opposite direction from the mounting tab 104 generally. Th In the first bent configuration either the keyhole 128 or the hole 132 can be used to mount to the support 100 to a structure. However, it should be appreciated that, because the secondary tab 130 is oriented rearward when the mounting tab 104 is rotated forward, the hole 132 is placed generally above the stem (e.g., between a front surface of the stem 106 and a rear plane defined by the sidewalls 114). In this way, a fastener (not shown) can be placed in a more optimal position for mounting. In particular, the moment acting on the mounting tab 104 can be reduced relative to other arrangements, resulting in improved load capabilities for the support 100 generally. Further, because the hole 132 is not disposed over the saddle 108, an installer may have more clearance underneath the hole 132 to use a rivet gun, a shot-fired gun, or other fastening mechanism can be used to secure the support 100. Similar clearance benefits can also generally result from the open configuration of the support 100 at the opening 152 between the extensions 126.

In the illustrated example, the bending region of the support 100 exhibits a hairpin profile in the first bend configuration, with a generally U-shaped bend and parallel extension to either side of the bend. In some cases, the arrangement of the bending region to provide this structural characteristic can closely correspond to the ability to also bend the support 100 into other useful bent configurations (e.g., as further discussed below). However, in some cases, other configurations are also possible.

Figure 6:
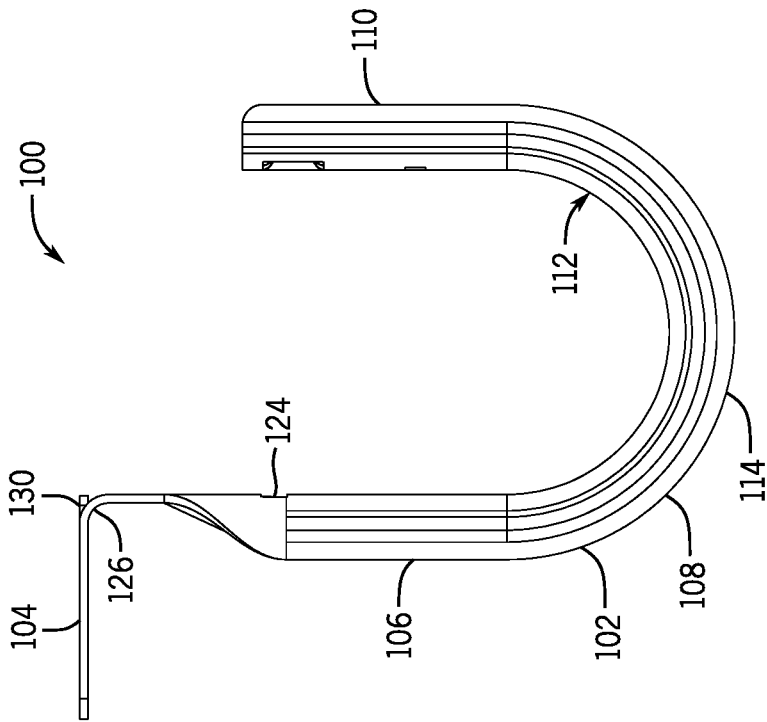
FIG. 6 is a side view of the data cable support of FIG. 1 in a second bent configuration.

Turning to FIGS. 5-6, the support 100 is shown in a second bent configuration, as may be preferable when mounting (e.g., hanging) the support 100 from a vertical threaded rod. However, in some cases, the second bent configuration may also be used to mount the support 100 to a horizontal surface, such as a ceiling or over the top edge of a wall. To reach the second bent configuration, the mounting tab 104 is bent to be substantially perpendicular to the first vertical direction, but opposite the first bent configuration, so that the mounting tab 104 extends rearward and away from the leg 110. Correspondingly, the secondary tab 130 will extend forward, in an opposite direction from the mounting tab 104 generally (i.e., towards the leg 110). To mount the support 100, a threaded rod or other fastener may be inserted through the large opening of the keyhole 128. Alternatively, a fastener may be inserted through the hole 132 in the secondary tab 130 or otherwise engaged.

Although FIGS. 1-6 show the support 100 with the mounting tab 104 in three particular configurations, use of the mounting tab 104 is not limited to these specific configurations. Rather, the mounting tab 104 may bent by any amount required by a specific application. For example, the mounting tab 104 could be bent (e.g., rotated about the bending region) anywhere between 0 and 180 degrees in either direction. In operation, bending of the mounting tab 104 can be accomplished in a number of ways. For example, an installer could first bend the mounting tab 104 using their hands, pliers, or another tool, and then mount the support 100 to a structure. Alternatively, an installer could first mount the support 100 to a structure, which would hold the mounting tab 104 securely to the structure. The installer could then grab the support body 102 to bend the support 100 into the desired configuration. Further, it should be appreciated that, in addition to providing a bendable mounting tab 104 that can be mounted on a number of surfaces, the bendable nature of the mounting tab 104 may also help to avoid pre-installed structures (e.g., other mounting brackets), while maintaining favorable alignment of the holes 128, 132 regardless of the direction of the bend.

In some embodiments, various features on different supports can be configured so that multiple supports can be joined together. For example, joining multiple supports may be done to provide additionally capacity (e.g., space for additional cables). Alternatively, it may be desirable to separate different types of data cables, or different sets of cables. In these cases, a number of auxiliary supports may sometimes be attached to a single main support. Alternatively, multiple supports may be attached to form a chain of supports. Because multiple supports can be attached to one another, only one of supports may actually need to be mounted to a wall, threaded rod, or other structure. This may be especially helpful in scenarios, for example, where limited mounting locations are available.

Figure 7:
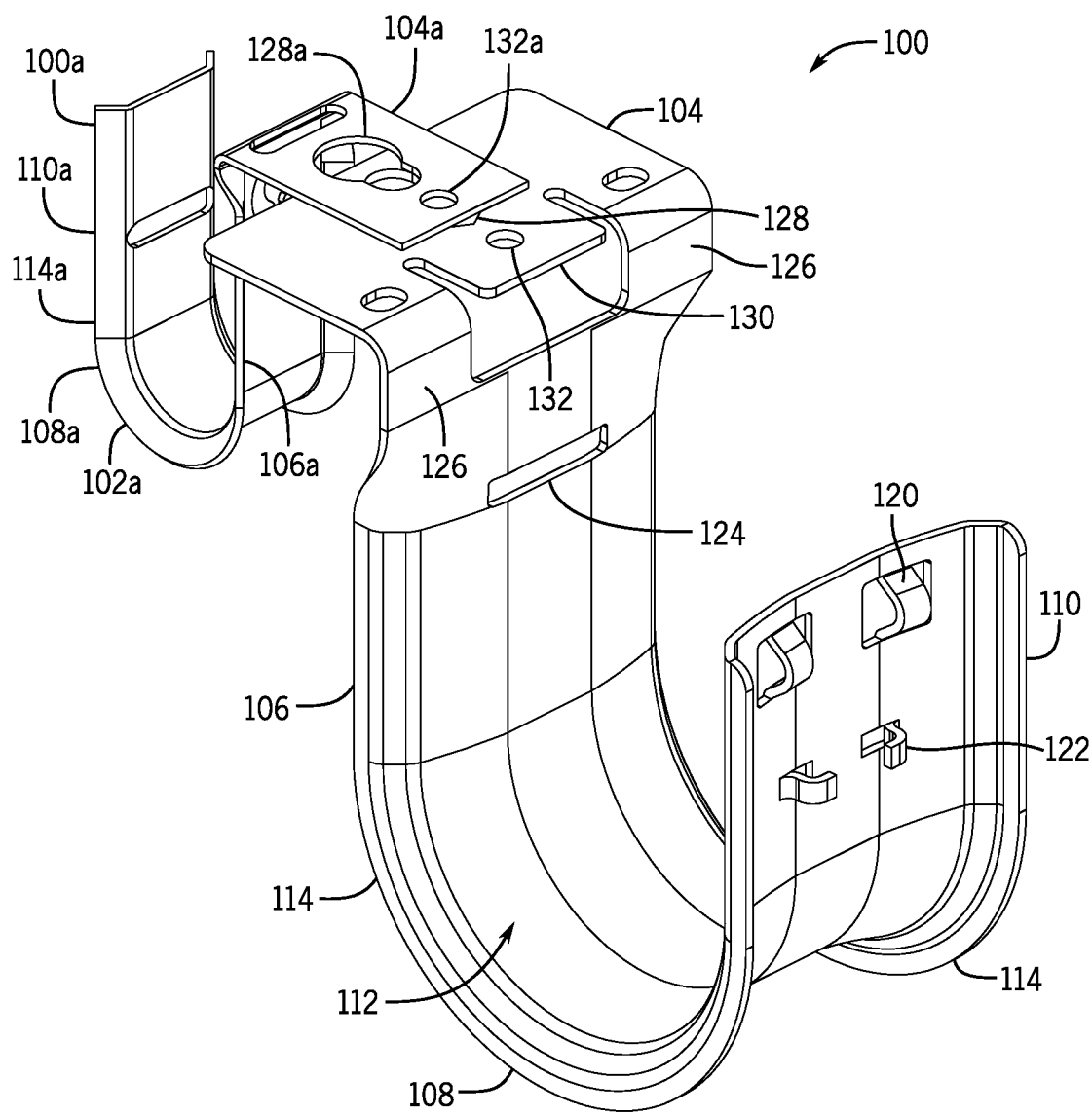
FIG. 7 is an isometric view of the data cable support of FIG. 1 in a second bent configuration, with a second support attached.

As one example, turning to FIG. 7, the support 100 is shown in the second bent configuration along with an auxiliary support 100a. The auxiliary support 100a is similar to the support 100 in that it is also a J-hook having support body 102a and a bendable mounting tab 104a. Further, the support body 102a includes a leg 110a, a saddle, 108a, a stem 106a, and sidewalls 114a, and the mounting tab 104a includes a keyhole 128a and a hole 132a that are disposed in and extend through the mounting tab 104a.

As can be seen, the auxiliary support 100a is in a similar bent configuration as the support 100, with the mounting tab 104a bent rearward and is substantially perpendicular to the stem 106a (i.e., equal to or within 10 degrees of perpendicular). This allows the mounting tabs 104 and 104a to be stacked or overlaid with one another. In this example, the mounting tab 104a of the auxiliary support 100a is overlaid on top of the mounting tab 104 of the support 100. Further, the auxiliary support 100a is positioned so that the small opening of the keyhole 128 aligns with the small opening of the keyhole 128a, and the hole 132a aligns with the large opening of the keyhole 128. However, other relative alignments are possible (e.g., with a reversed stacking configuration, or other alignment of mounting holes). Further, in some cases, the auxiliary support 100a can be installed separately (e.g., alone), including via direct attachment to a wall, ceiling, or other building structure.

Figure 8:
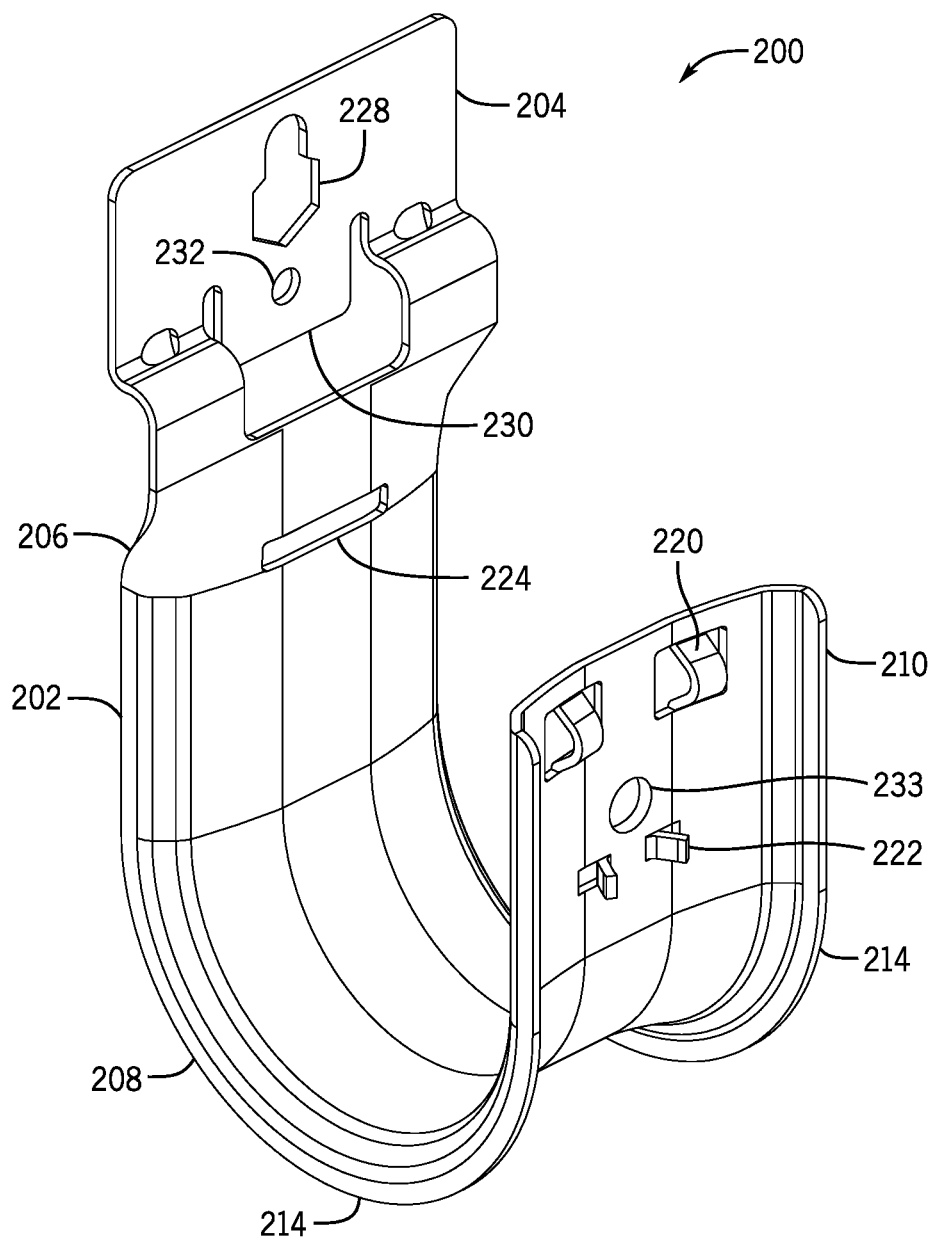
FIG. 8 is an isometric view of a data cable support according to another embodiment of the invention.
Figure 9:
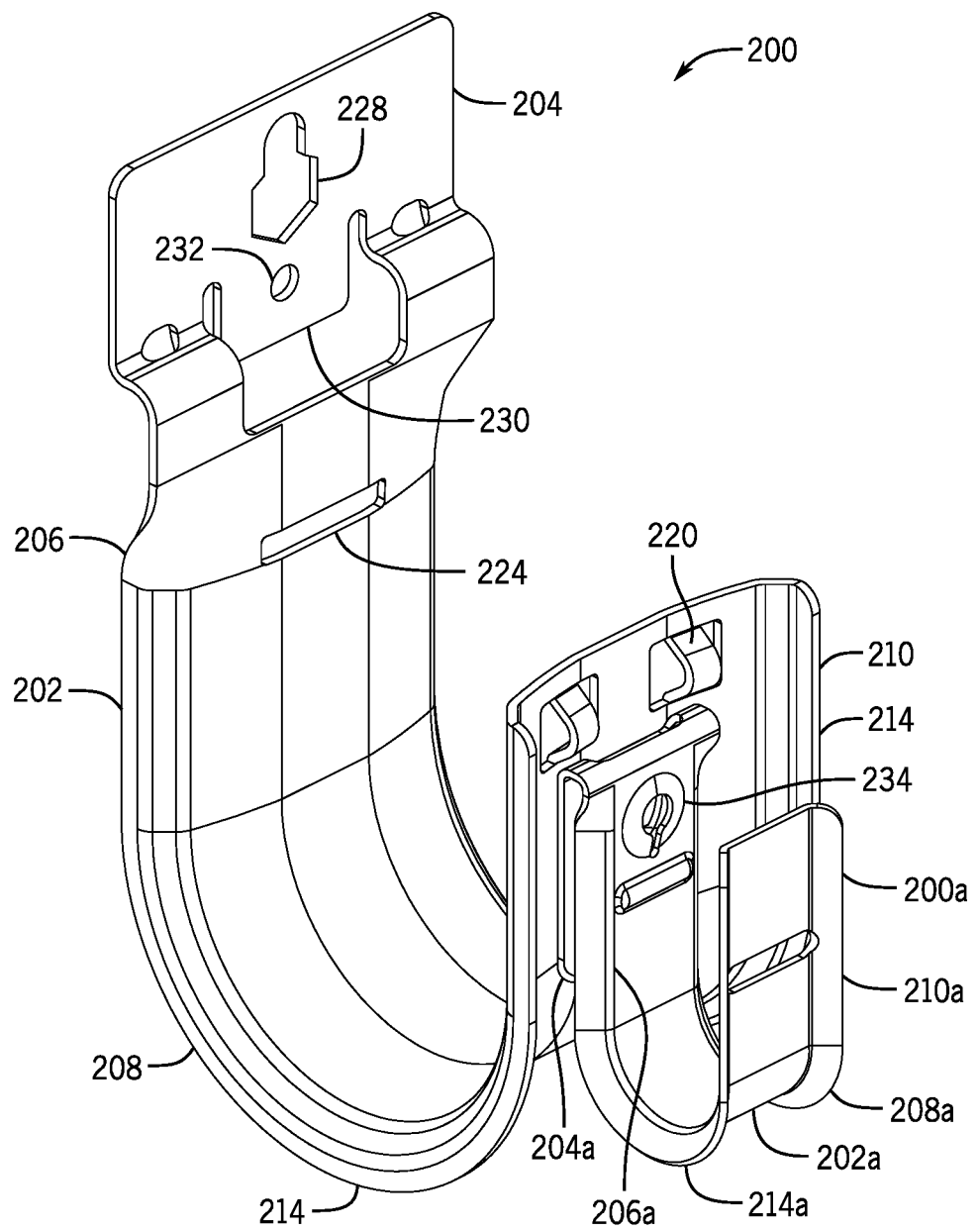
FIG. 9 is an isometric view of the data cable support of FIG. 8 with a second support attached.

Turning to FIGS. 8-9, a support 200 according to another embodiment of the invention is shown. The support 200 is similar to support 100, with like numerals referring to like features, but also includes an additional hole 233 in the leg 210 (see FIG. 8). In some cases, the hole 233 can allow the support 200 to connect with other auxiliary supports.

For example, as is shown in FIG. 9, an auxiliary support 200a is coupled to the leg 210 of the support 200, via the hole 232. The auxiliary support 200a is similar to auxiliary support 100a (see FIG. 7) and, in the illustrated example, further includes a thread impression 234a in the stem 206a. Furthermore, in the illustrated configuration, the mounting tab 204a is bent rearward by approximately 180 degrees (i.e., at 180 degrees or within 15 degrees thereof) so that the mounting tab 204a is in contact with the rearmost edges of the sidewalls 214a, thereby providing a flat surface for mounting. To secure the auxiliary support 200a to the leg 210, the mounting tab 204a is placed on the leg 210 so that the thread impression 234a is concentric with the hole 233. A fastener can then be inserted through hole 233 to engage with the thread impression 234a and securely couple the auxiliary support 200a to the support 200.

Figure 11:
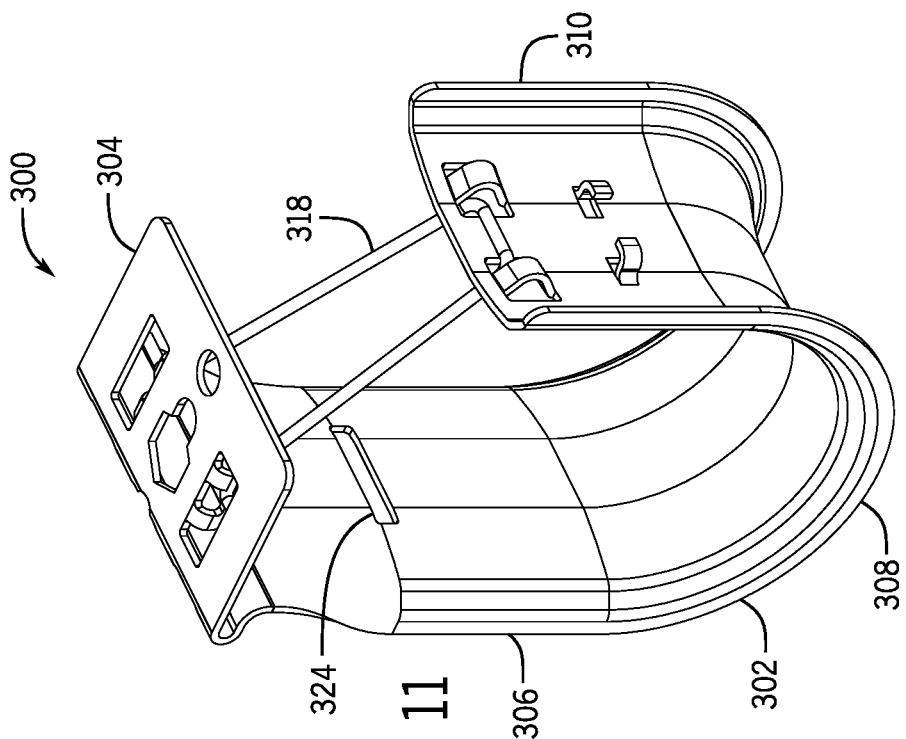
FIG. 11 is an isometric view of the data cable support of FIG. 10 in a first bent configuration.
Figure 10:
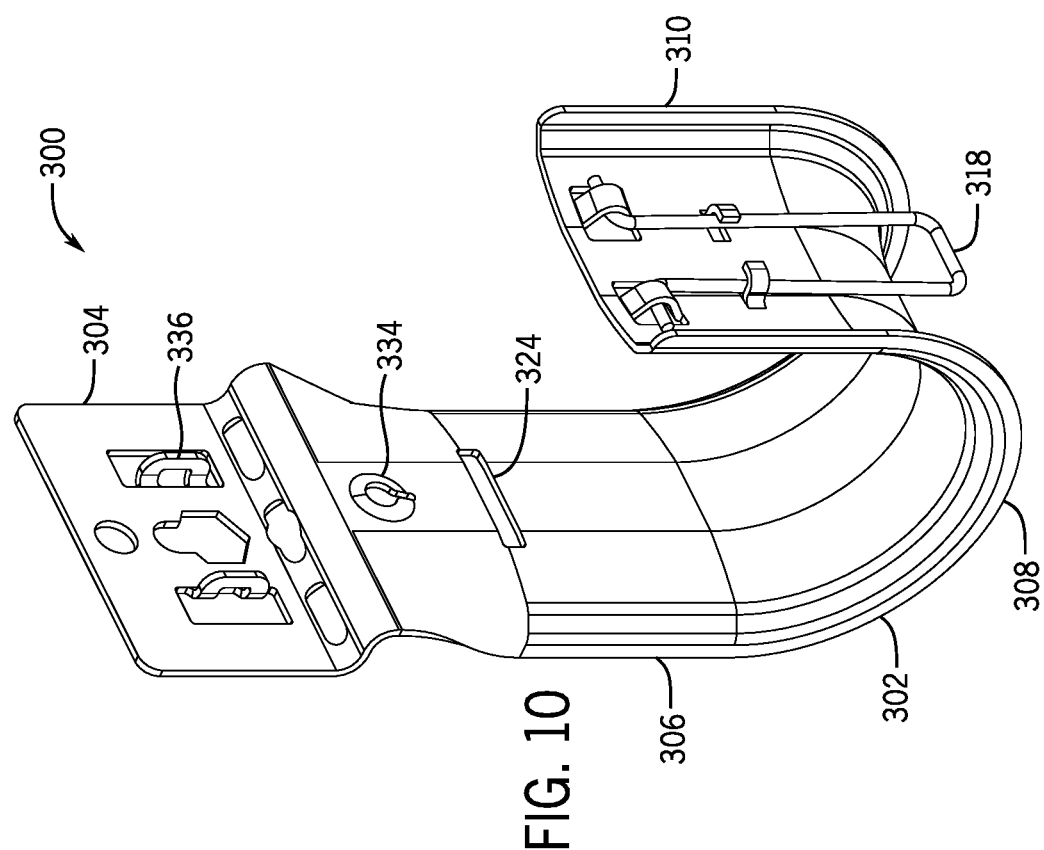
FIG. 10 is an isometric view of a data cable support according to another embodiment of the invention.

FIGS. 10-11 illustrate a support 300 according to another embodiment of the invention. The support 300 is similar to support 100, with like numerals referring to like features. In particular the support includes a support body 302 defining a stem 306 that is coupled with a mounting tab 304 at a bending portion. However, the support 300 includes a thread impression 334 on a stem 306, the thread impression 334 being disposed above a slot 324. Additionally, the stem 306 includes a single extension that connects the stem 306 with the mounting tab 304 at the bending portion. The bending portion includes three relief holes, the central relief hole including a central portion configured to receive a threaded rod when the mounting tab 304 is in a second bent position. Further, the mounting tab 304 includes a pair of u-shaped retaining features 336 disposed on opposite sides of the keyhole 328, and the keyhole 328 is disposed below the circular hole 332.

As is best shown in FIG. 11, the retaining features 336 are configured to receive the hooks of a securing member 318, in this case a bail, when the support 300 is in the first bent configuration. Thus, when the support 300 is in the first bent configuration, the securing member 318 can be put into either a first closed position, wherein the hooks engage with the slot 324, or a second closed position, wherein the hooks engage with the u-shaped retaining features 336. Further, in the second closed positions, the securing member 318 can provide some structural support, via tensile loading of the securing member 318 by a load on the support 300, as supported by the slot 124 and the retaining features 336. In this regard, accordingly, the load capacity of the support 300 can be increased.

Figure 13:
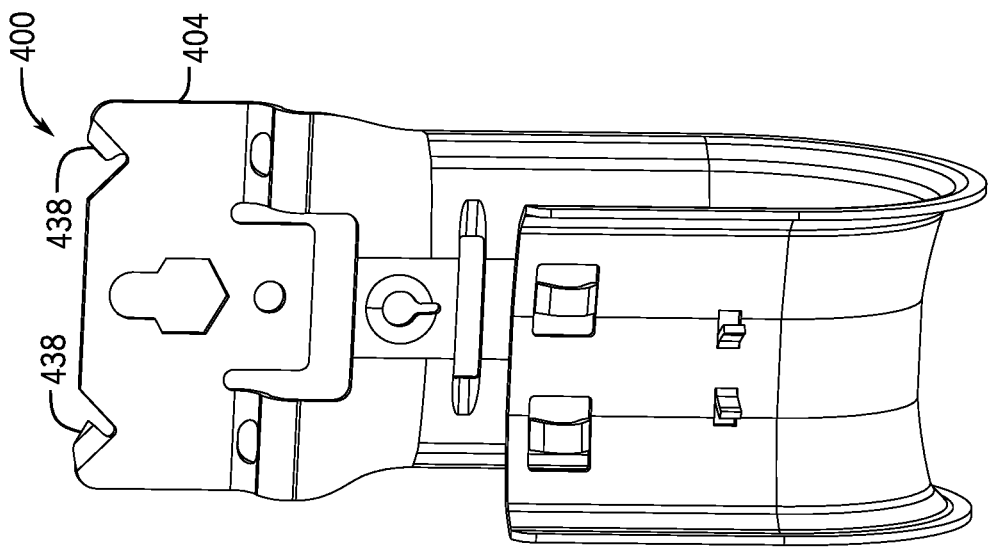
FIG. 13 is an isometric view of the data cable support of FIG. 12 with the anti-rotation tab in an engaging configuration.
Figure 12:
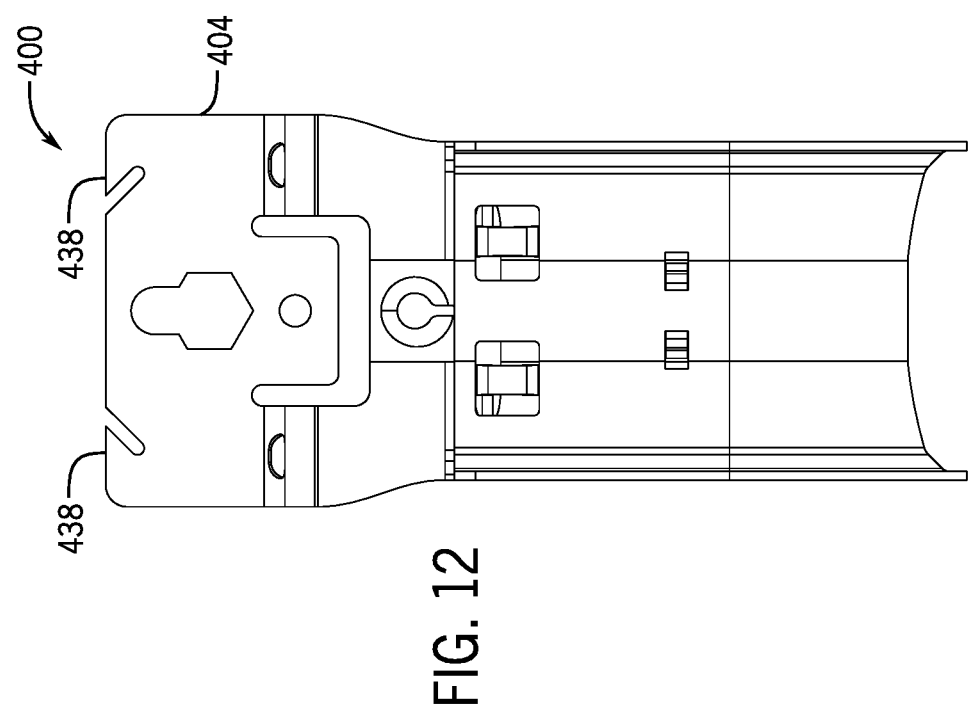
FIG. 12 is front view of a data cable support according to another embodiment of the invention, the data cable support including an anti-rotation tab in a non-engaging configuration.

In some cases, penetrating tabs or other anti-rotation features can be provided, as may help to prevent a support from pivoting excessively relative to an attachment point (e.g., at a bolt, screw, or rod that extends through a mounting tab). In this regard, for example, FIGS. 12-13 illustrate a support 400 according to another embodiment of the invention. The support 400 is similar to the support 100, but also includes anti-rotation tabs 438 configured as bendable prongs on an upper edge of a mounting tab 404. Each of the anti-rotation tabs 438 are configured to prevent the support 400 from rotating about a fastener in some installations.

In the illustrated example, each anti-rotation tab 438 is defined by a diagonal slot that is cut into the top edge of the mounting tab 404. The anti-rotation tabs 438 are thus independently movable relative to the mounting tab 404 between a non-engaging position (see FIG. 12) and an engaging position (see FIG. 13). In the non-engaging configuration, both anti-rotation tabs 438 are flush with both the front and back of the mounting tab 404. Conversely, in the engaging position one or both of the anti-rotation tabs 438 are bent either forward or backward to protrude outward from the respective front or back surface of the mounting tab 404. In this position, the pointed end of respective anti-rotation tab 438 can be embedded into structure, for example, a wall, a ceiling, or a post, as the support 400 is moved toward the structure (e.g., by a fastener) during mounting. After being embedded in the surface, the anti-rotation tab 438 can provide an opposing force to resist rotation of the support 400 around a fastener.

Figure 14:
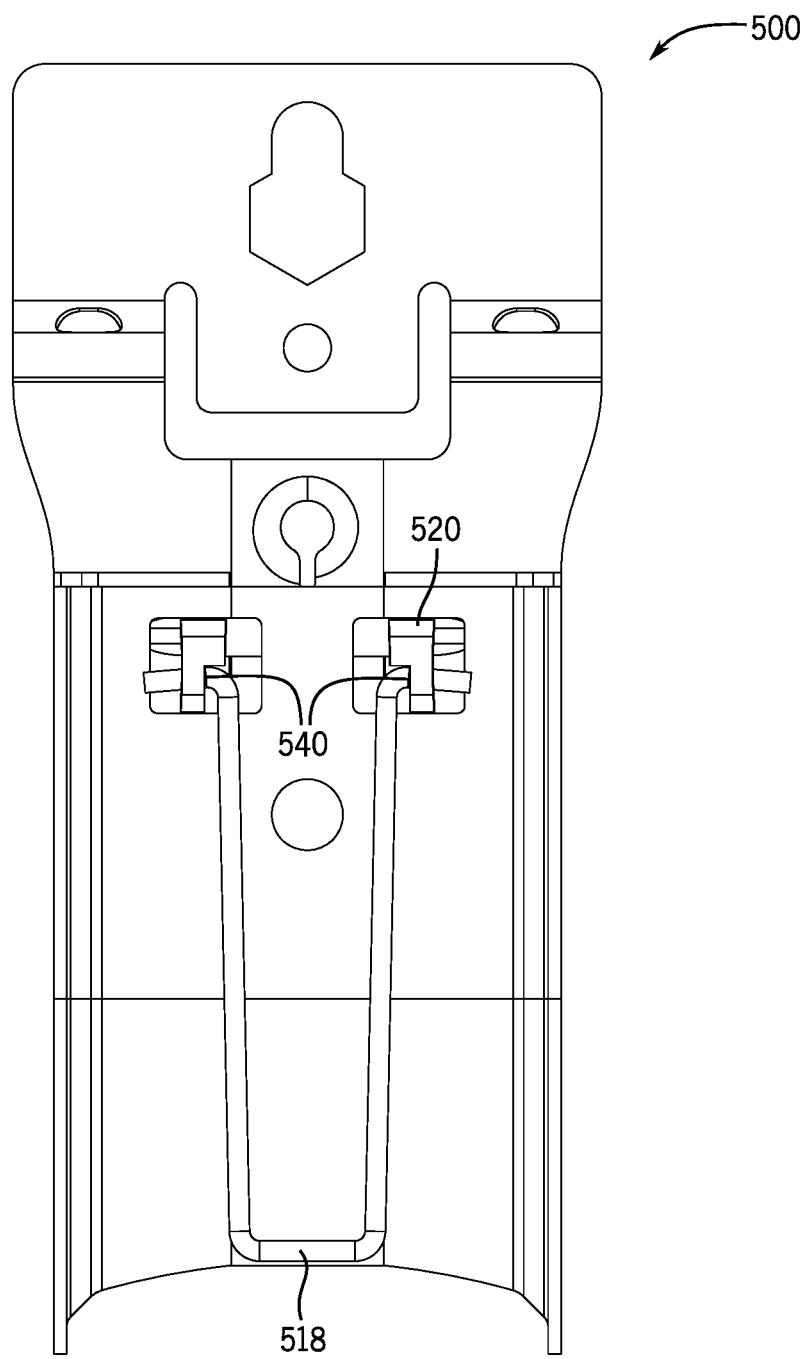
FIG. 14 is a front view of a data cable support according to another embodiment of the invention.

In some embodiments, other structures may be used to retain a bail or other securing member in an open position. For example, in FIG. 14, a support 500 is shown having a securing member 518 retained in an open position. In this case, the securing member 518 is a bail having two arms extending from a central portion and a hook portion on the distal end of each arm. The support 500 is similar to other disclosed supports and includes an attachment feature 520 for attaching the securing member 518 to the support 500. The attachment feature 520 includes two holes with a u-shaped loop bridging each of the holes. Further, each u-shaped loop includes a notch 540 on a lower side of the loop. The notches 540 are configured to engage with arms of the securing member 518, thereby retaining the securing member 518 in the open position. More specifically, after an installer has compressed the arms of the securing member 518 and slid the securing member 518 to engage the hooks of the securing member 518 in the u-shaped loops of the attachment feature 520, the securing member 518 can be rotated downward to allow the arms of the securing member 518 to spring outwardly into the notches. Further, because the notches define an upper lip, the securing member 518 cannot rotate upwardly and out of the open position until the arms of the securing member 518 are once again compressed by an installer.

Turning now to FIGS. 15-20, a support 600 according to another embodiment of the invention is shown. The support 600 is similar to the support 100, with like numerals generally referring to like features, but includes a different bail configuration and a differently configured mounting tab that is formed from an extension of a stem of a support body. In particular, the support 600 includes a support body 602 that is integrally formed with a mounting tab 604 having a non-planar geometry. The support body 602 defines a stem 606, a saddle 608, and a leg 610, which together define a support surface 612 configured to support a plurality of data cables (not shown) or other objects. The support surface 612 has a convex curvature that is perpendicular to its length (i.e., a length taken along the stem 606, saddle 608, and leg 610), although other configurations are possible. Additionally, the support body 602 includes sidewalls 614 on opposing sides of the support body 602, which run substantially along the length of the support body 602 (e.g., along the stem 606, the saddle 608, and the leg 610). The sidewalls 614 extend away from the support surface 612 and are generally locally perpendicular to the length of the support 600, although other configurations are possible.

In some embodiments, a support can include a securing member to secure data cables within the support body. For example, with continued reference to FIGS. 15-20, the support 600 includes securing member 618 configured as a resilient, generally u-shaped wire bail. The securing member 618 has two arms that extend perpendicularly from a central portion along the same direction and hooks that extend substantially inward from a respective distal end of each of the arms to extend towards one another. In some cases, the hooks can also be angled in the direction of the central portion. The securing member 618 is moveably received within holes 620 that are formed on opposing lateral sides of a recessed portion 610a at an upper end of the leg 610. In particular, in the illustrated example, the holes 620 are formed on a protruding portion of the leg 610 that is separated from the support surface 612 by a slot. More specifically, the holes 620 are disposed along curved portions connecting between the recessed portion 610a and the sidewalls 614, and are each configured to slidably receive one of the arms of the securing member 618 and to engage an inwardly extending hook at an end of a corresponding one of the arms of the securing member 618 to secure the securing member 618 in an open configuration (see FIG. 15).

The securing member 618 is manipulable by a user to be moved between an open position (see e.g., FIG. 15) that permits data cables to be received by and removed from the support 600, and a closed position (see e.g., FIGS. 17 and 19) that secures data cables within the support 600. More specifically, in the open position, the securing member 618 is moved forward (e.g., slid forward and rotated downward) so that the hooks engage the holes 620 and the arms are secured by retaining tabs 622. Conversely, in the closed position, the securing member 618 is moved rearward (e.g., rotated upward and slid rearward) so that the central portion of the securing member 618 is positioned near a front side of the recessed portion 610a and so that the hooks of the securing member 618 are received within a corresponding pair of slots 624 formed in the stem 606 to lockably engage a rear side thereof.

In the illustrated example, each slot 624 includes a lead-in portion 624a (e.g. a ramped portion formed by bending a portion of the stem 606 rearward), and the hooks engage with the rear side of the lead-in portions 624a. Thus, as the hooks are pressed into the lead-in portions 624a, the hooks and arms of the securing member 618 are urged to be spread apart until they can enter the slots 624, after which the resilient nature of the securing member 618 forces the arms and hooks to move inward and engage the rear side of the stem 606. The contour of the lead-in portions 624a on the rear side of the stem 606 can then engage the hooks to help secure the securing member 618 in the closed position.

Figure 15:
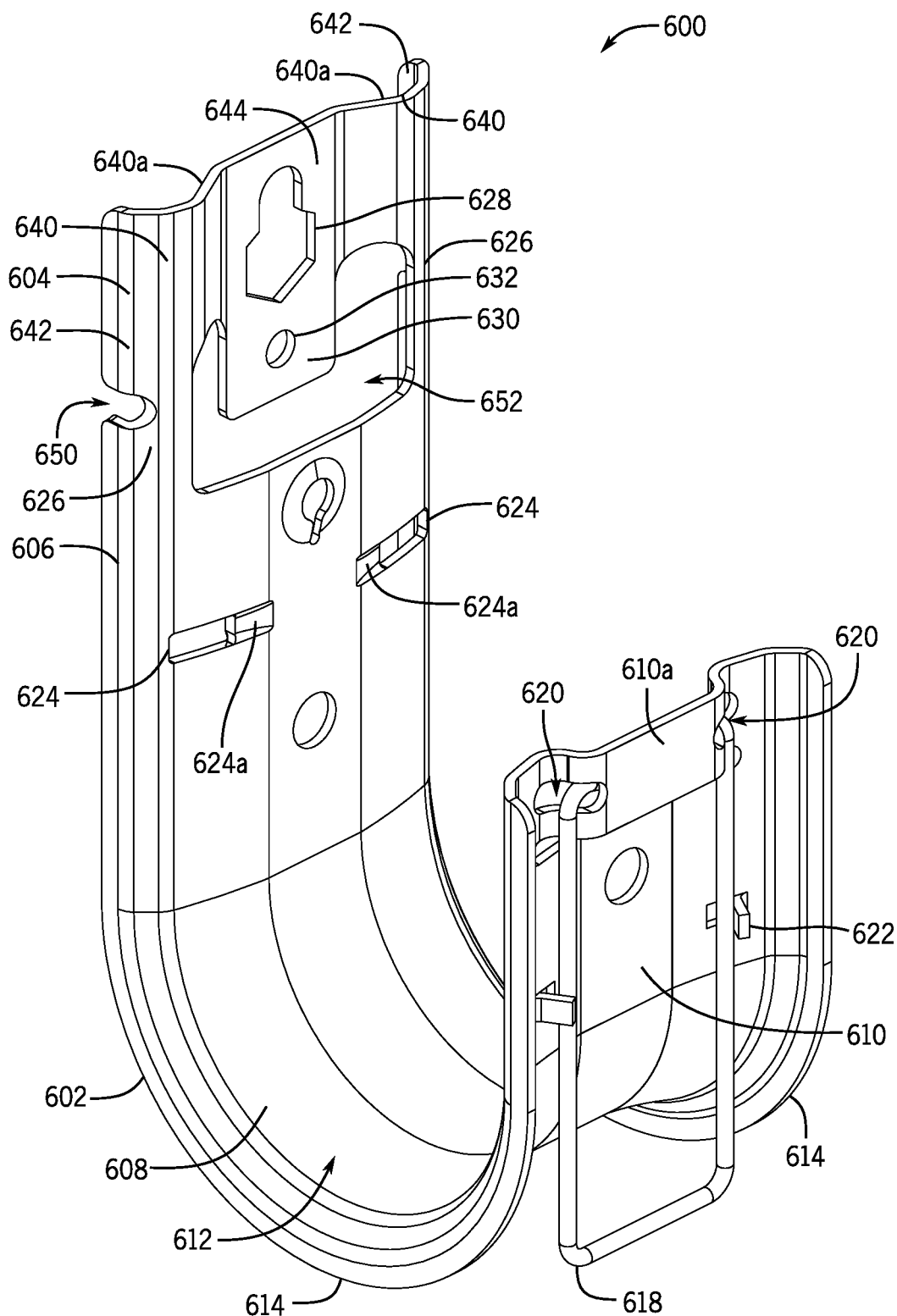
FIG. 15 is an isometric view of a data cable support according to another embodiment of the invention.
Figure 16:
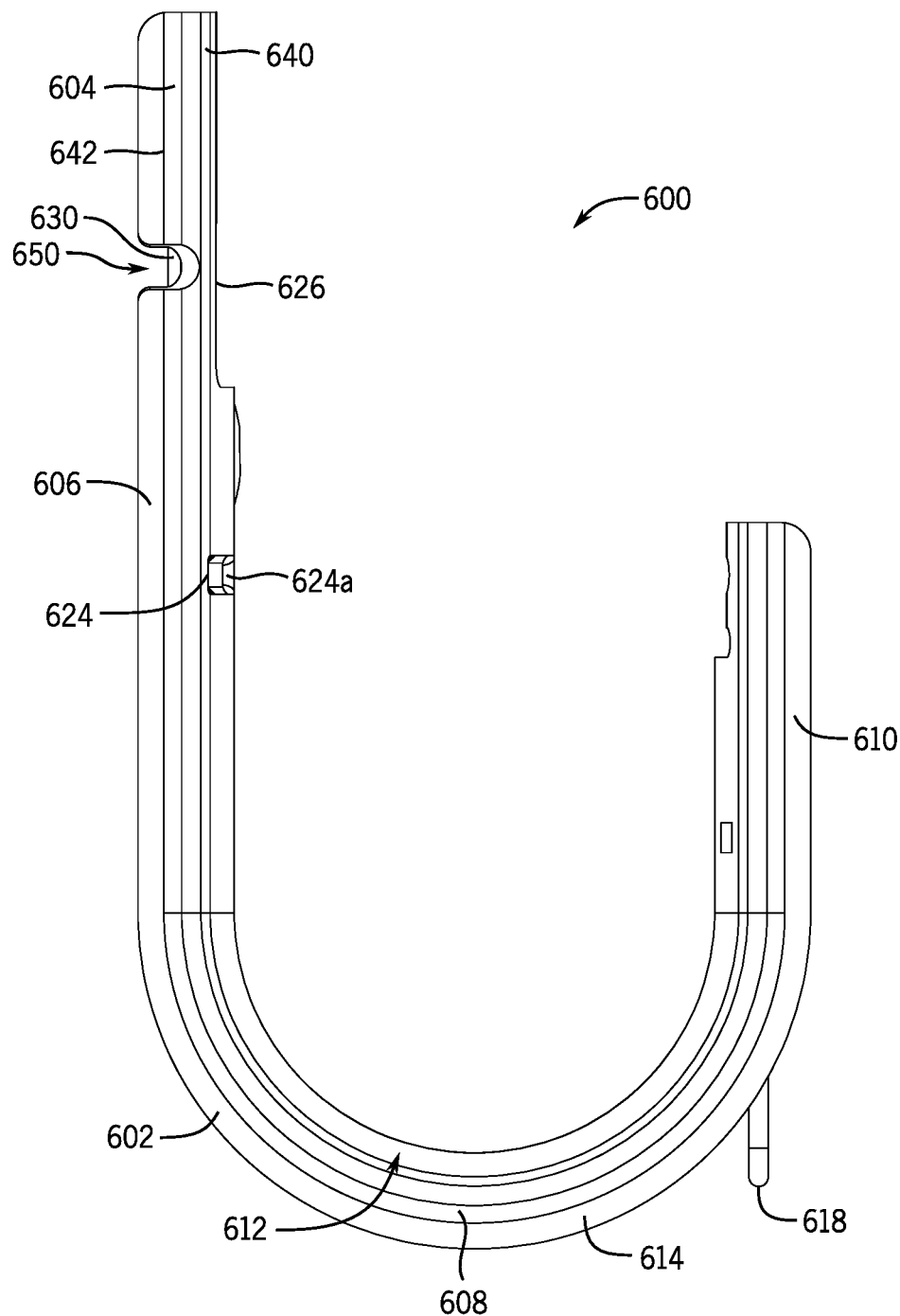
FIG. 16 is a side view of the data cable support of FIG. 15.

Additionally, in some embodiments, a mounting tab can be formed from a portion of a stem of a support. For example, still referring to FIGS. 15-20, the mounting tab 604 is formed from an upper distal end of the stem 606. Accordingly, the mounting tab 604 is configured as a contoured (i.e., not flat) mounting tab. More specifically, the mounting tab 604 includes lateral contoured portions 640 having contoured cross sections that are similar in shape to the corresponding portions of the stem 606 disposed directly below, as shown in FIG. 15. In that regard, the contoured portions 640 have sidewalls 642 that are configured similarly to the sidewalls 614 of the support body 602 and, more specifically, the stem 606. The contoured portions 640 further define extensions 626 extending between the mounting tab 604 and the stem 606 (e.g., so that lateral contoured portions 640 of the mounting tab 604 extend continuously from lateral contoured portions of the stem 606). In addition, the mounting tab 604 includes a flattened central portion 644 that is disposed between and connected with the contoured portions 640.

For example, the mounting tab 604 can define a transition portion 640a that extends between and connects the respective contoured portions 640 to the flattened central portion 644. Correspondingly, the transition portions 640a can have contoured cross sections that differ in shape to the corresponding portions of the stem 606 disposed directly below, as shown in FIG. 15. The contour of the transition portions 640a can vary moving from the contoured portions 640 to the flattened central portion 644. For example, as illustrated, each transition portion 640a defines a first curved region connected to the respective contoured portion 640 and a second curved region connected to the flattened central portion 644. Here, the first curved portion has an average curvature that is greater than and opposite an average curvature of the second curved portion. Further, a flattened portion extends between the first and second curved portions. In other embodiments, the specific shape of the transition portions can be different, for example, the first and second curved portions may be directly connected to one another to define an inflection point between the respective curvatures.

As illustrated, the central portion 644 of the mounting tab 604 can be recessed from a front plane of the mounting tab 604 (e.g., a plane defined by the forward most extent of the contoured portions 640) toward a rear plane of the mounting tab 604 (e.g., a rear plane defined by the rearmost edge of each sidewall 642). More specifically, the central portion 644 of the mounting tab 604 can be disposed anywhere between the front and rear planes of the mounting tab 604. In other embodiments, the central portion 644 can be recessed so as to be flush with the rear plane of the mounting tab 604 and/or the support 600. Further, the central portion 644 can include various features to allow the support 600 to be mounted to a variety of support surfaces (i.e., building or other support structures), for example, a keyhole 628 and a rounded hole 632 that are disposed along a secondary tab 630 extending downward toward the stem 606, although other configurations are possible.

To allow a user to bend the mounting tab 604 relative to the support body 602, notches 650 or one or more other bend features (e.g., score-lines) can be formed between the mounting tab 604 and the stem 606 (e.g., in the extensions 626) to remove or otherwise weaken a portion of the sidewalls 614, 642. As illustrated, the notches 650 are configured as a pair of opposed notches that are disposed across from one another on opposing lateral sides of the support 600. However, other configurations are possible. In addition, a u-shaped opening 652 can be formed between the central portion 644 of the mounting tab 604 and the stem 606, and between the extensions 626 (e.g., by cutting or punching out), although openings with other shapes are also possible. Removal of material to create the opening 652 allows for the central portion 644 to be flattened and recessed toward the rear plane, as well as making it easier for a user to manipulate the mounting tab 604. In that regard, a bending region can be formed between each of the notches 650 and the opening 652 to allow the mounting tab 604 to be bent (e.g., manually bent) by a user. For example, the mounting tab 604 can be bent forward from an unbent configuration that allows mounting of the support 600 to a side of a wall (see FIGS. 15 and 16), to a first bent configuration for mounting to a ceiling or other downward facing support surface (see FIGS. 17 and 18), or can be bent rearward to a second bent configuration for mounting to a threaded rod or a top of a wall (see FIGS. 19 and 20). However, the support 600 is not limited to these specific mounting configurations.

Where a mounting tab is provided with sidewalls, the sidewalls can, in some cases, act as anti-rotation features to prevent a support from pivoting excessively relative to an attachment point (e.g., at a bolt, screw, or rod that extends through a mounting tab). For example, with specific reference to the first bent configuration illustrated in FIGS. 17 and 18, because the central portion 644 is disposed between the front and rear planes of the mounting tab 604, the sidewalls 642 extend upward (e.g., away from the support body 602) and beyond the central portion 644. Thus, for example, when a fastener (not shown) is inserted into one of the holes 628, 632 to secure the support 600 to a ceiling or other support surface (not shown), the force of the fastener acting on the central portion 644 can force the sidewalls 642 into firm contact with the ceiling. In some cases, this force can cause the sidewalls 642 to become embedded in the ceiling (e.g., as the central portion 644 is moved to be flush with the ceiling), thereby allowing the sidewalls 642 to provide an opposing force to resist rotation of the support 600 around the fastener.

The sidewalls 642 can also provide similar anti-rotation capabilities in other configurations and in conjunction with other types of support surfaces. For example, in some applications where the support 600 is mounted to a hard support surface (e.g., concrete), the sidewalls 642 may not embed into the support surface. Instead, because there is an offset between the central portion 644 of the mounting tab 604 and the rear edges of the sidewalls 642, the sidewalls 642 can contact the support surface and the mounting tab 604 can be bent (e.g., from the insertion of a fastener) to move the central portion 644 toward and potentially into contact with the support surface. This bending of the mounting tab 604 can result in a spring pressure along the edges of the sidewalls 642 where they are in contact with the support surface. Accordingly, the spring force and resulting friction acting between the sidewalls 642 and the support surface can provide a torsional resistance against a moment acting on the support 600 from, for example, a fastener being inserted into the mounting tab 604 and/or cables being pulled across the saddle 608.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

We claim:

1. A cable support comprising:
   a support body that includes a saddle configured to support one or more cables and a stem that extends in a first direction from a rear end of the saddle that is opposite a front end of the saddle;
   a mounting tab configured to be secured to a support structure, the mounting tab extending from the stem and including a secondary tab; and
   at least one extension connecting the mounting tab to the support body so that there is an opening between the secondary tab and the support body, the at least one extension being bendable relative to the support body to move the mounting tab between:
   a wall-mount configuration, in which the mounting tab extends substantially parallel to the first direction and away from the stem, and the secondary tab extends substantially parallel to the first direction and toward the stem,
   a ceiling-mount configuration, in which the mounting tab extends in a forward direction relative to the saddle and the secondary tab extends in a rearward direction relative to the saddle, and
   a rod-mount configuration, in which the mounting tab extends in a rearward direction relative to the saddle and the secondary tab extends in a forward direction relative to the saddle.

2. The cable support of claim 1, wherein the at least one extension includes a first extension and a second extension that are separated by the opening.

3. The cable support of claim 2, wherein the mounting tab includes a central flattened portion between lateral contoured portions, the first extension and the second extension extending between respective lateral contoured portions and the stem.

4. The cable support of claim 3, wherein the central flattened portion includes one or more holes configured to receive a fastener to secure the cable support to the support structure; and
wherein the secondary tab extends from the central flattened portion and includes at least one of the one or more holes.

5. The cable support of claim 3, wherein, except for one or more bend features, the first and second extensions and the lateral contoured portions of the mounting tab extend continuously from lateral contoured portions of the stem.

6. The cable support of claim 5, wherein each of the first and second extensions includes a bend feature configured as a notch.

7. The cable support of claim 3, wherein the lateral contoured portions include sidewalls extending rearward to define a rear plane of the mounting tab, the central flattened portion being offset forward of the rear plane so that the sidewalls engage the support structure as the cable support is secured to the support structure at the central flattened portion.

8. The cable support of claim 7, wherein engagement of the sidewalls with the support structure prevents the cable support from rotating.

9. The cable support of claim 1, wherein the support body further includes a leg extending from the front end of the saddle.

10. A cable support for use with building structures comprising:
a support body that includes a saddle configured to support one or more cables and a stem that extends from a first end of the saddle in a first direction; and
a mounting tab that extends from the stem and includes one or more holes configured to receive a fastener to secure the cable support to one or more building structures;
the cable support being bendable to move the mounting tab, relative to the support body, between a wall-mount configuration, in which the mounting tab extends substantially in parallel with the first direction, a ceiling-mount configuration, in which the mounting tab is rotated away from the wall-mount configuration in a first rotational direction to extend over the saddle, and a rod-mount configuration, in which the mounting tab is rotated away from the wall-mount configuration in a second rotational direction to extend away from the saddle.

11. The cable support of claim 10, wherein a secondary tab extends from the mounting tab and moves with the mounting tab relative to the support body.

12. The cable support of claim 11, wherein the secondary tab extends substantially in parallel with the first direction in the wall-mount configuration, away from the saddle in the ceiling-mount configuration, and toward the saddle in the rod-mount configuration.

13. The cable support of claim 11, wherein the secondary tab includes at least one of the one or more holes.

14. The cable support of claim 11, wherein the mounting tab is secured to the support body via extensions that are separated by an opening extending between the mounting tab and the stem; and
wherein the secondary tab extends into the opening when the mounting tab is in the wall-mount configuration.

15. The cable support of claim 10, further comprising:
a securing member configured to be movable relative to the support body to a first configuration, to secure one or more cables within the saddle; and
one or more retaining tabs configured to secure the securing member in a second configuration, to permit one or more cables to be moved into or out of the saddle.

16. The cable support of claim 15, wherein the securing member is a bail that is pivotably and slidably secured at a distal end of a leg of the support body that extends from a second end of the saddle opposite the stem; and
wherein the one or more retaining tabs are formed as hooks on one or more of:
the leg, between the distal end of the leg and the saddle, and
the saddle.

17. The cable support of claim 10, wherein at least one bend feature is provided between the stem and the mounting tab to allow the mounting tab to bend relative to the stem.

18. The cable support of claim 17, wherein the at least one bend feature includes at least two notches that are disposed along opposing lateral sides of the cable support.

19. A method of installing a cable support to a support structure, the method comprising:
securing a support body to the support structure via a mounting tab, the support body including a saddle configured to support one or more cables and a stem extending from a first end of the saddle in a first direction, the mounting tab extending from the stem in a second direction, and including one or more holes configured to receive a fastener to secure the support body to the support structure and a secondary tab; and
applying a force to the support body to selectively bend the mounting tab relative to the support body from any one of (i) a wall-mount configuration, in which the mounting tab extends substantially parallel to the first direction and away from the stem, and the secondary tab extends substantially parallel to the first direction and toward the stem, and (ii) a ceiling-mount configuration, in which the mounting tab is rotated away from the wall-mount configuration in a first rotational direction to extend over the saddle, and so that the secondary tab extends away from the saddle, to a rod-mount configuration, in which the mounting tab is rotated away from the wall-mount configuration in a second rotational direction to extend away from the saddle, and so that the secondary tab extends toward the saddle.

20. The method of claim 19, wherein the force is applied to the support body after the support body is secured to the support structure via the mounting tab.

* * * * *